United States Patent
Mitchell

(10) Patent No.: US 6,741,841 B1
(45) Date of Patent: May 25, 2004

(54) DUAL RECEIVER FOR A ON-BOARD ENTERTAINMENT SYSTEM

(75) Inventor: James P. Mitchell, Cedar Rapids, IA (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

(21) Appl. No.: 09/493,771

(22) Filed: Jan. 28, 2000

(51) Int. Cl.[7] .............................................. H04B 1/18
(52) U.S. Cl. ................................ 455/188.1; 455/12.1
(58) Field of Search .......................... 455/12.1, 431, 455/427, 428, 13.3, 13.2, 430, 188.1, 266; 370/321, 316, 511; 380/13, 212

(56) References Cited

U.S. PATENT DOCUMENTS

| | | | |
|---|---|---|---|
| 4,910,527 A | * 3/1990 | Dushane et al. ............ 343/786 |
| 5,214,505 A | 5/1993 | Rabowsky et al. ........... 358/86 |
| 5,220,419 A | 6/1993 | Sklar et al. ................... 358/86 |
| 5,249,303 A | * 9/1993 | Goeken ....................... 455/431 |
| 5,289,272 A | 2/1994 | Rabowsky et al. ............. 348/8 |
| 5,382,026 A | 1/1995 | Harvard et al. ............. 273/310 |
| 5,463,656 A | * 10/1995 | Polivka et al. .............. 375/130 |
| 5,507,025 A | * 4/1996 | Rodeffer ..................... 455/266 |
| 5,694,176 A | 12/1997 | Bruette et al. .............. 348/563 |
| 5,708,963 A | * 1/1998 | Mobley et al. ............. 455/12.1 |
| 5,737,009 A | 4/1998 | Payton ........................... 348/7 |
| 5,760,819 A | 6/1998 | Sklar et al. ..................... 348/8 |
| 5,790,175 A | 8/1998 | Sklar et al. ..................... 348/8 |
| 5,790,935 A | 8/1998 | Payton ....................... 455/5.1 |
| 5,801,751 A | 9/1998 | Sklar et al. |
| 5,831,662 A | 11/1998 | Payton ........................... 348/7 |
| 5,835,057 A | * 11/1998 | Van Heyningen ........... 342/359 |
| 5,844,636 A | 12/1998 | Joseph et al. ............... 348/845 |
| 5,886,995 A | 3/1999 | Arsenault et al. |
| 5,896,558 A | * 4/1999 | Wiedeman ................. 455/12.1 |
| 5,940,148 A | 8/1999 | Joseph et al. ............... 348/845 |
| 5,990,826 A | 11/1999 | Mitchell |
| 5,990,928 A | 11/1999 | Sklar et al. .................. 348/8.6 |
| 6,061,562 A | * 5/2000 | Martin et al. ............... 455/431 |
| 6,160,993 A | * 12/2000 | Wilson ....................... 455/12.1 |
| 6,160,994 A | * 12/2000 | Wiedeman ................. 455/12.1 |
| 6,185,409 B1 | * 2/2001 | Threadgill et al. ......... 455/12.1 |
| 6,201,797 B1 | * 3/2001 | Leuca ......................... 370/316 |
| 6,249,677 B1 | * 6/2001 | Noerpel et al. ............. 455/427 |
| 6,285,878 B1 | * 9/2001 | Lai ............................. 455/431 |
| 6,339,707 B1 | * 1/2002 | Wainfan et al. ............. 455/427 |
| 2002/0039900 A1 | * 4/2002 | Wiedeman et al. ......... 455/428 |
| 2002/0072389 A1 | * 6/2002 | Ward et al. ................. 455/552 |

OTHER PUBLICATIONS

Co–pending patent application Docket No. 00CR063/KE entitled "Communication System and Method for a Mobile Platform" filed on an even date, inventor J. Mitchell.

Co–pending patent application Docket No. 00CR64/KE entitled "System and Method for Internet Access on a Mobile Platform" filed on an even date, inventor J. Mitchell.

Co–pending patent application Docket No. 99CR047/KE entitled "Wireless Airport Gateway Communications System" filed on an even date, inventor J. Mitchell.

Pending patent application Docket No. 99CR011/KE entitled "Aircraft Satellite Communications System for Distributing Internet Service From Direct Broadcast Satellites" filed Sep. 13, 1999, with S/N 09/394,820, inventor J. Mitchell.

Chapter 9: Internet, Data and Satellite Broadcasting www.bitmicro.com, "E–Disk SUW35".

* cited by examiner

Primary Examiner—Nick Corsaro
Assistant Examiner—Tan Trinh
(74) Attorney, Agent, or Firm—Nathan O. Jensen; Kyle Eppele

(57) ABSTRACT

A communication system is provided for use with a mobile platform. The communication system can be configured to store video data on-board to allow pseudo-live or live broadcasts to be played as the mobile platform traverses a number of broadcasts regions. The mobile platforms can be automobiles, aircraft, boats, ships, trains, or other vehicles. The communication system allows Internet access, movies, and other entertainment and business functions to be performed.

20 Claims, 14 Drawing Sheets

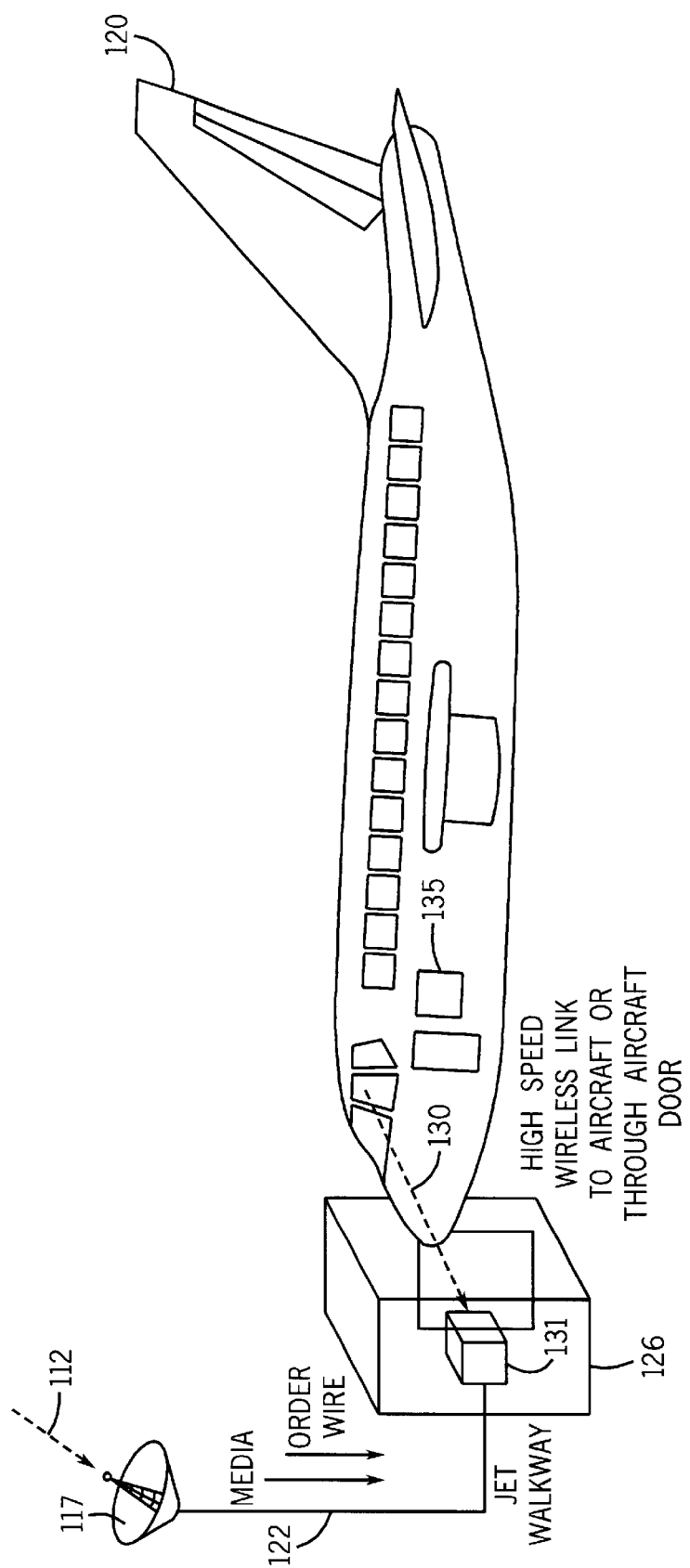

DUAL RECEIVER FOR A ON-BOARD ENTERTAINMENT SYSTEM

CROSS REFERENCE TO RELATED APPLICATIONS

The present application is related to U.S. application Ser. No. 09/394,820, entitled "Aircraft Satellite Communications System for Distributing Internet Service from Direct Broadcast Satellites," invented by James P. Mitchell filed on Sep. 13, 1999. The present application is also related to U.S. application Ser. No. 09/493,770, filed on an even date herewith by Mitchell entitled, "Wireless Airport Gateway Communications System." The present application is also related to U.S. application Ser. No. 09/493,472, filed on an even date herewith by Mitchell entitled, "Communication System and Method for a Mobile Platform" and U.S. application Ser. No. 09/494,198, filed on an even date herewith by Mitchell entitled, "System and Method for Internet Access on a Mobile Platform".

BACKGROUND OF THE INVENTION

This present invention relates generally to a communication system for a mobile platform. More particularly, the present invention relates to a data delivery system for on-board entertainment and office systems of mobile platforms. In general, on-board entertainment and office systems can be utilized to generate video images and audio content for occupants of a mobile platform. The video images and audio content can be related to movies, telephone conversations, and other entertainment-based or business-based material.

Mobile platforms, such as, automobiles, airplanes, trains, and boats have included on-board entertainment systems. These systems generally provide audio-visual content to a display screen. The audio-visual content can be provided from wireless, off-board sources and from on-board sources. On-board sources can include equipment which plays audio discs, audio tapes, video discs and video tapes.

One type of conventional on-board entertainment system is an aircraft passenger entertainment system. The aircraft passenger entertainment system can provide passengers with audio generated from audio tape players, movies derived from video tape players, and interactive services, such as, games, shopping and telecommunications. With the exception of interactive services related to telecommunication services (air-to-ground telephone calls), the aircraft passenger entertainment system generally utilizes strictly on-board sources (tape players, etc.) to provide content. Utilizing strictly on-board sources does not allow "live" programs or time sensitive programs, such as, news, sporting events, and commercial programming to be viewed on the aircraft. Video and audio tapes can take as long as several months to prepare before being available for viewing on the aircraft. Such a delay makes the viewing of sporting events, news programs, commercial television, stock reports, and other time sensitive material undesirable.

Alternatively, on-board entertainment and office systems for mobile platforms can utilize off-board sources. For example, automobiles can include spread spectrum or ultra high frequency (UHF) or very high frequency (VHF) broadcast antennae for receiving specialized or commercial television signals, respectively. In another example, proposed on-board entertainment systems for aircraft utilize digital broadcast satellite systems to provide live or near live video entertainment (television broadcasts) to passengers aboard an aircraft. However, the use of direct broadcast satellite (DBS) systems as well as UHF and VHF broadcast systems can be problematic as the mobile platform enters and exits zones where the signals cannot be received. For example, transoceanic flights often enter locations which are out of range of the satellite system. Similarly, platform position, geographic considerations, and other electromagnetic radiation blocking phenomenon can prevent a mobile platform from appropriately receiving data from a wireless source.

In addition, direct broadcast satellite systems and other broadcast systems cannot feature content for particular mobile platforms. The same data is received by all mobile platforms within the range of the source. Occupants of aircraft, trains, and ships having particular destinations may wish to receive content related to the destination. The content may even include commercials or advertisements directed toward features associated with the destination of the mobile platform. For example, it is desirable to show advertisements or previews for casinos, conventions, or other attractions associated with the destination. Thus, conventional off-board sources cannot provide audio and visual content directed to occupants of particular mobile platforms.

Further, conventional off-board sources cannot provide content directed to particular types of mobile platforms, such as the type of aircraft. For example, safety messages must be specialized for particular types of aircraft. The same safety message cannot be sent via off-board sources to every aircraft in the fleet.

It is also desirable to provide Internet access to occupants of the mobile platforms. The Internet has become extremely popular and continues to grow at exponential rates. For example, aircraft passengers could utilize the Internet for both business and entertainment purposes. In addition, the Internet is being sought as a necessity for electronic messaging as well as an alternative to television.

Current stand-alone communications systems utilized by most mobile platforms lack the capacity or bandwidth to support true high-speed multi-user Internet browsing. These systems have been optimized for some data uses but are generally used to support low-bandwidth data and voice communications, typically ranging from 2400 bits per second to 19.2 kilobits per second.

Direct broadcast satellite (DBS) television systems are in wide use for the delivery of television programming directly to terrestrial homes of viewers. DBS systems operate in the Ku-band frequency range of 11.70 to 12.75 GHz. A DBS system typically consists of a DBS ground station for uplinking the programming, a geosynchronous orbiting transponder satellite for receiving the programming from the ground station on one frequency and downlinking the programming on another frequency, and multiple viewers with dish antennas and DBS receivers for receiving the downlinked programming. Digital compression is used to increase the amount of programming available from a satellite. MPEG-2 and MPEG-4 are the standard compression technologies in use by most DBS systems. A program provider or data source collects the programming data and sends it to the DBS ground station for uplinking to the satellite. Programming may be collected from sources by reception from other satellites, fiber optic lines, or the rebroadcast of digital tape. The programming may include data other than television programming such as Internet services. The data is compressed and encrypted before transmission. The viewer receives the downlink signals from the satellite on a parabolic dish antenna.

The dish antennas are small (typically 18-inches to three feet in diameter) which makes the dish antennas attractive for home use. However, even small dish antennas can be undesirable in certain mobile platform applications due to wind resistance and stability considerations.

A down converter is typically located with the dish antenna and down converts the received signal into an L-band intermediate frequency (IF) signal. The L-band IF signal is sent by cable to the DBS receiver in the home. The DBS receiver decodes, decompresses, amplifies and converts the signal into a viewable TV image.

On-board entertainment and office systems, such as, aircraft systems require the efficient delivery of data such as movies, programs, airline schedules, Internet data, e-mail communications and maps to passengers. This data needs to be updated or replaced so that new in-flight entertainment movies, new safety messages, and other information can be presented in flight. Also, mobile platform data, such as aircraft data from a FOQA (Flight Operations Quality Assurance) system generated in flight needs to be removed from the aircraft and transferred to an appropriate recipient of the data. Heretofore, the updated and new data as well as the aircraft data is manually transported between the aircraft and the terminal.

Thus, there is a need for a mobile platform communication system that offers efficient delivery of data between a mobile platform and a docking area. There is another need for a wireless connectivity between an aircraft and an airport terminal; the wireless connectivity should offer much higher bandwidth than existing low-bandwidth communications systems. There is also a need for a direct broadcast satellite (DBS) system for delivering video data for storage on a mobile platform. Further, there is a need for a direct broadcast satellite system that can provide high-speed Internet service to a mobile platform along with DBS television programming simultaneously while using a single small antenna system that can easily be mounted on the mobile platform. Further still, there is a need to utilize excess capacity on a DBS television transponder to provide the modest bandwidth needs for Internet service on mobile platforms. There is also a need for a low-speed, communications channel, such as, an air-to-ground channel, which enables a full interactive Internet capability on a mobile platform.

Even further, there is a need for a communication system that can transfer large amounts of data between a data source and a mobile platform parked in a docking area without hand carrying media containing the data. Further still, there is a need for a communications system that can use existing communications systems, such as, direct broadcast satellites and telephone systems for transfer of data between the data source, the data recipient, and the mobile platform.

Still further, there is a need for a communication system which can provide entertainment directed to passengers of a particular mobile platform while utilizing video signals received from off-board the mobile platform. Even further still, there is a need for a communications system which can adjust to provide a continuous video stream as a mobile platform travels from areas of reception to non-reception. Yet further, there is a need for a communications system which includes receivers which allow video data to be received as the mobile platform travels across the earth.

SUMMARY OF THE INVENTION

An embodiment relates generally to a communication system for a mobile platform. The mobile platform is stationary at a docking area. The communication system includes a wireless docking area transceiver, a wireless platform transceiver, and a storage unit. The storage unit is located on the mobile platform. The wireless docking area transceiver provides video data to the wireless platform transceiver while the mobile platform is at the docking area. The storage unit stores the video data for playback in the mobile platform.

Another embodiment also relates to a video system for a mobile platform. The mobile platform is capable of traveling to a docking area which has a first transceiver for providing data representative of video. The video system includes a short-range transceiver configured to receive the data, a storage unit coupled to the short-range transceiver, and a processor coupled to the storage unit. The short-range transceiver stores the data. The processor generates the video in response to the data stored in the storage unit.

Still another embodiment further relates to a communication system for a mobile platform. The communication system includes a wireless docking area transceiver, a first means for transmitting data, a second means for receiving data, and a third means for storing the data received by the second means. At least a portion of the data includes video data. The first means is located at the gate area, and the second means is located at the mobile platform. The third means is located at the mobile platform and stores the data received by the second means.

Yet another embodiment relates to a method of showing video images related to video data on a mobile platform. The mobile platform is capable of traveling to a location. The location has a transmitter. The method includes: electronically receiving the video data from the transmitter with a receiver while the mobile platform is proximate the location, storing the video data on-board the mobile platform, and displaying the video images on-board the mobile platform in accordance with the video data stored on-board the mobile platform.

An embodiment still further relates to a communication system for a mobile platform. The communication system includes a direct broadcast receiver located on the mobile platform and a computer network including at least one terminal on the mobile platform, the terminal providing Internet access through the direct broadcast receiver.

An embodiment also relates to a method of providing Internet service to a mobile platform. The mobile platform includes a direct broadcast receiver located on the mobile platform and computer network. The mobile platform also includes at least one terminal on the mobile platform. The method includes: providing Internet data to the computer network on the mobile platform via the direct broadcast receiver, and providing the Internet data to the terminal.

An embodiment even further still relates to a communication system for a mobile platform. The communication system includes a first receiver circuit disposed on a platform, a second receiver circuit disposed on the platform, and a control circuit. The control circuit is coupled to the first receiver circuit and the second receiver circuit. The first receiver circuit and the second receiver circuit receive video data. The control circuit selects the video data from the first receiver circuit and the Ku-band receiver circuit to continuously receive the video data as the mobile platform moves from a first zone to a second zone.

An embodiment even further still relates to a method of receiving video data on a mobile platform. The method includes receiving first video data transmitted from a first band-type satellite when the mobile platform is in a first zone for playback on the mobile platform, and receiving second video data transmitted from a second band-type satellite receiver circuit when the mobile platform is in a second zone for playback on the mobile platform. The first zone is in an area where the first video data can be received effectively from the first band-type satellite, and the second zone is in an area where the second data can be effectively received from the second band-type satellite.

An embodiment specifically relates to a communication system for a mobile platform. The mobile platform is stationery at a docking area. The communication system includes a wireless docking area transmitter, a wireless platform receiver unit, and a storage unit. The storage unit is located on the mobile platform. The wireless docking area transmitter provides order wire data to the wireless platform receiver unit. The storage unit stores the order wire data. Video is provided on the mobile platform in accordance with the order wire data.

An embodiment relates to the method of providing electronic browsing services on a mobile platform. The mobile platform includes at least one terminal. The method includes receiving order wire data indicating a default home page from an external source. The method also includes beginning the electronic browsing service at the default home page.

An embodiment also relates to a communication system for a mobile platform. The communication system includes a receiver, a computer network, and a terminal. The computer network is couple with the receiver. The receiver receives in advertising spots indication. The terminal is coupled with the computer network. The computer provides advertising spots that are associated with the advertising spots indication.

BRIEF DESCRIPTION OF THE DRAWINGS

The invention may be more fully understood by reading the following description of the preferred exemplary embodiments in conjunction with the appended drawings, wherein like numerals denote like elements, and:

FIG. 8 is a more detailed schematic diagram of an alternative embodiment of system illustrated in FIG. 7;

DETAILED DESCRIPTION OF PREFERRED EXEMPLARY EMBODIMENTS

Figure 1:
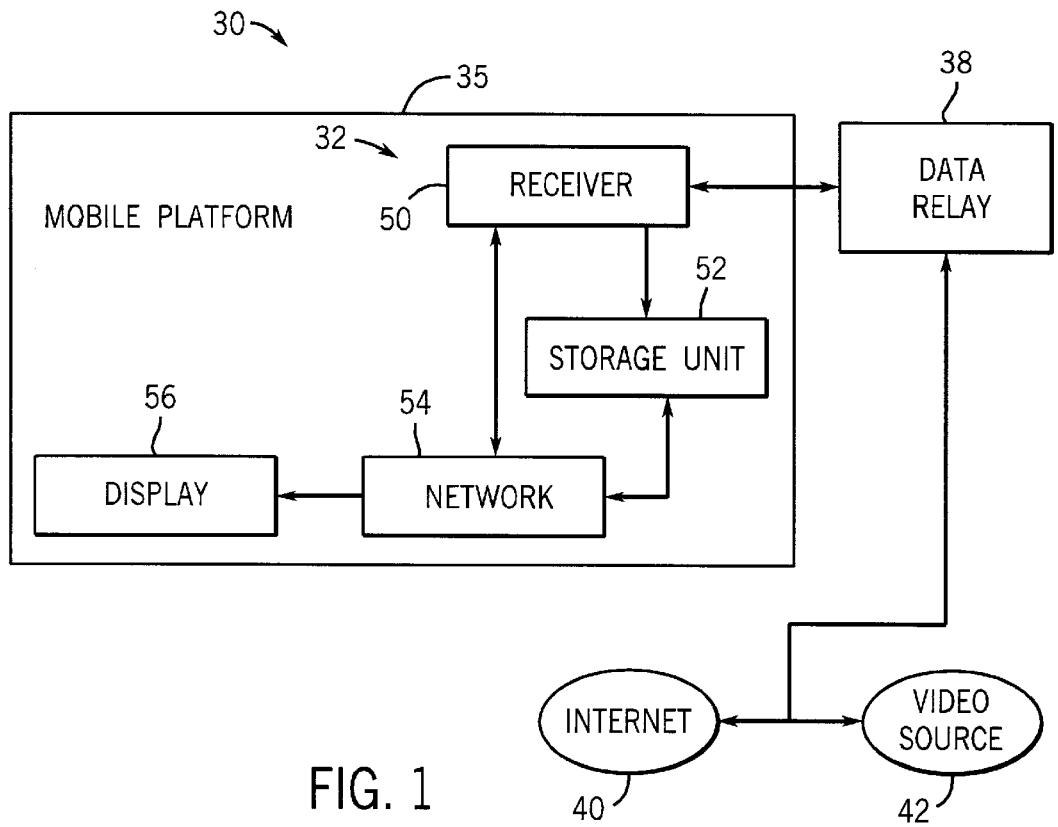
FIG. 1 is a general schematic block diagram of a communication system for a mobile platform.

With reference to FIG. 1, a communication system 30 can be utilized in an application including a mobile platform 35. Preferably, an on-board entertainment and business system 32 is disposed on mobile platform 35. System 32 can be similar to an in-flight entertainment system for an airplane and includes a receiver 50, a storage unit 52, a network 54, and a display 56.

Mobile platform 35 can be any vehicle which is not fixed to a permanent location. Mobile platform 35 can be an aircraft, automobile, truck, bus, train, boat, ship, gondola, monorail, or any vehicle for transporting occupants between locations. Embodiments of communication system 30 are discussed in greater detail with respect to FIGS. 1–14. In FIGS. 3–14, embodiments of the communication system 30 are discussed with respect to an exemplary platform 35, shown as an airplane. Nonetheless, the principles and advantages of communication system 30 can be applied to any type of mobile vehicle.

Receiver 50 is configured to receive signals representing data from a wireless source, such as relay 38. The data from relay 38 preferably includes video data for use with system 32. Relay 38 can be a UHF or VHF antenna, a spread spectrum antenna, a direct broadcast antenna, a satellite transponder, or any apparatus for providing a wireless connection to platform 35. The wireless connection is utilized to provide video data to receiver 50. The video data can also include audio data representative of audio content or conversations. Alternatively, a separate medium or channel can be utilized to provide audio data.

The video data can be representative of Internet services, informational video messages, movies, electronic mail, voice mail, live or recorded television programs, commercials, telephone conversation, and other entertainment-based or business-based material. Relay 38 can generate the video data from a variety of internal and external sources. For example, relay 38 can receive information or data from external sources, such as, Internet 40 or a video source 42. Video source 42 can be a broadcast station, a receiving antenna, satellite, a tape player, a disc player, or other device which can provide video data to relay 38. The video data from either source 42 or Internet 40 can be provided to receiver 50 through relay 38. The video data can represent live programs, time sensitive shows, movies, Internet web pages, or other visual media.

Receiver 50 can be any type of wireless communication unit capable of receiving video data from relay 38. In addition, receiver 50 can be configured as a transceiver to provide data to relay 38 which in turn provides data to video source 42 and Internet 40. The video data received by receiver 50 can be stored in storage unit 52 and/or can be provided to network 54 for display on display 56 or both. According to another alternative, receiver 50 can be configured to provide signals representative of the video data directly to display 56.

Display 56 can be a central display for all occupants of mobile platform 35. Alternatively, display 56 can be an in-seat display for passengers or operators of mobile platform 35. Display 56 can include one or more display units, such as cathode ray tubes (CRTs), projection screens, liquid crystal displays (LCDs), plasma displays or LED displays.

Network 54 is a computer-based network that is capable of providing signals to display 56 from both storage unit 52 and receiver 50. Network 54 can be a local area network (LAN). Network 54 and storage unit 52 can provide digital or analog video data to display 56 when reception by receiver 50 is not possible due to geographic considerations, the position of platform 35, or other reception problems between relay 38 and receiver 50. Thus, display 56 can advantageously provide continuous visual images and audio content, whether or not platform 35 can receive signals from relay 38.

Storage unit 52 can include stored video data and audio data. The stored video data can be received from relay 38 while mobile platform 35 is mobile. Alternatively, storage unit 52 can include an on-board source, such as, video discs or video tapes, which can be utilized when receiver 50 cannot receive video data from relay 38. Alternatively, storage unit 52 can receive the video data through a direct wireless link while mobile platform 35 is docked at a docking area as described below with reference to FIG. 2. Storage unit 52 can be a solid state memory, a disc drive capital or magnetic, a tape drive, or other apparatus capable of storing video data or signals.

Display 56 can be a computer terminal equipped with a CRT, an LCD or any apparatus for providing visual images. Display 56 can also include speakers, telephones, headphones or other devices for providing audio content. Preferably, display 56 is a terminal or personal computer including a telephone, keyboard, mouse interface and video screen through which an occupant can access network 54. The occupant can access Internet 40 and select and view video images from video source 42 through network 54.

Figure 2:
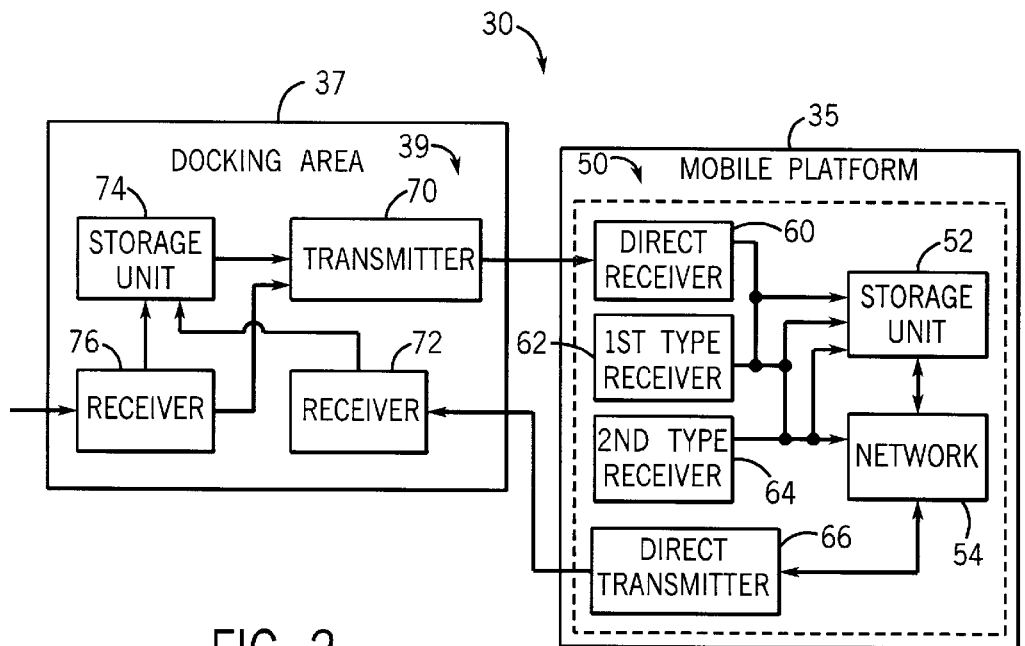
FIG. 2 is a more detailed schematic block diagram of the communication system illustrated in FIG. 1, the communication system is shown configured for communication when the mobile platform is located at a docking area.

With reference to FIG. 2, system 30 includes mobile platform 35 which is located at a docking area 37. Mobile platform 35 and docking area 37 in FIG. 2 can be embodied as an airplane located at a gate or terminal, a ship located at a port, a train located at a station, an automobile or bus located at a garage, a toll booth or service station, or other mobile platform located at a staging area. Preferably, the conventional placement of mobile platform 35 at docking area 37 stations receiver 50 within range of a transmitter 70. Platform 35 includes a communication unit (such as communication unit 51 in FIG. 4) comprised of receiver 50, network 54, and storage unit 52.

In FIG. 2, receiver 50 includes a direct receiver 60, a first type receiver 62, and a second type receiver 64. Direct receiver 60 is configured to receive signals from docking area 37 and is coupled to storage unit 52. Receivers 60, 62 and 64 are also coupled to network 54. Receiver 50 of platform 35 also includes a direct transmitter 66.

Receiver 60 is utilized for communications between platform 35 and docking area 37 (preferably, while platform is stationary or docked at area 37). Receivers 62 and 64 are preferably utilized to receive data while platform 35 is mobile. Receivers 62 and 64 generally can receive real-time programming on several channels from external sources while platform 35 is mobile.

A communication unit 39 is located at docking area 37. Communication unit 39 includes a direct transmitter 70, a direct receiver 72, a storage unit 74, and an external receiver 76. External receiver 76 preferably receives video data and order wire data from an external source and provides the video data to transmitter 70 or may be warehoused temporarily in storage unit 74. The order wire data is explained in more detail below. Alternatively, transmitter 70 can then receive video data from storage unit 74. Transmitter 70 provides a direct broadcast signal to direct receiver 60 on mobile platform 35. Receiver 60 and transmitter 70 can be configured to communicate over a high speed, low range direct channel. The video data received by receiver 76 can be provided to network 54 and storage unit 52 via transmitter 70 and receiver 60. Preferably, transmitter 70 can provide voice data to receiver 60 at speeds much greater than the playback speed.

The video data can include news programs, television programs, pseudo live broadcasts, or other information. In addition, transmitter 70 can provide video data for push-type Internet access. For example, the video data can include web pages provided on storage unit 52 for access on-board platform 35 via network 54. Push-type Internet access does not allow the user full bi-directional access to the Internet.

The video data can also include commercials or programs that are directed particularly for occupants of platform 35. For example, advertisements directed to occupants in mobile platform 35 can be stored on unit 52 for eventual playback through network 54. Thus, platform 35 can receive programs and advertisements while at docking area 37 that are directed specifically to occupants of platform 35. Spots or commercials can be generated from the video data stored on unit 52 for insertion into programs played for occupants of platform 35. The spots or commercials can be inserted into programs received by receivers 60 and 62.

The video data can also include safety messages for the particular type of platform 35 or informational messages associated with a destination for platform 35. Safety and informational messages associated with platform 35 can be stored on storage unit 52 and provided via network 54 to occupants. Safety messages can include FAA regulated introductions to air travel. Informational messages can include immigration and customs requirements for the destination of platform 35.

In addition, data about mobile platform 35 can be provided from direct transmitter 66 to receiver 72. Direct transmitter 66 can be coupled to storage unit 52 directly or through network 54. The data about platform 35 can include operational information about platform 35 and network 54. For example, maintenance information or condition information about platform 35 can be downloaded via transmitter 66. The data from transmitter 66 received by receiver 72 and can be provided to storage unit 74.

Direct transmitter 66 and transmitter 70 are preferably short range communication units. System 30 can be designed so that transmitters 66 and 70 only require a range of several feet or a few meters. In this way, several mobile, platforms 35 can communicate to several docking areas 37 without interference and without utilizing different frequency ranges. In addition, utilizing short range devices for receivers 60 and 72 and transmitters 70 allows smaller antennas (several inches or less) to be employed. Receivers 70 and 72 can utilize a probe antenna.

Transmitter 66 and receiver 60 as well as transmitter 70 and receiver 72 can be a transceiver unit. Receivers 62 and 64 can also be transceivers or be integrated as a single unit. Similarly, receiver 62 can also be a transceiver capable of sending data to a destination external to area 37.

Storage unit 52 can be a single memory unit or multiple memory units. Storage unit 52 can include hard disk drives, laser disk drives, floppy disk drives, flash memory devices, solid state memory, tape drives, and other devices which are capable of storing data. Storage unit 74 can be similar to unit 52.

Figure 3:
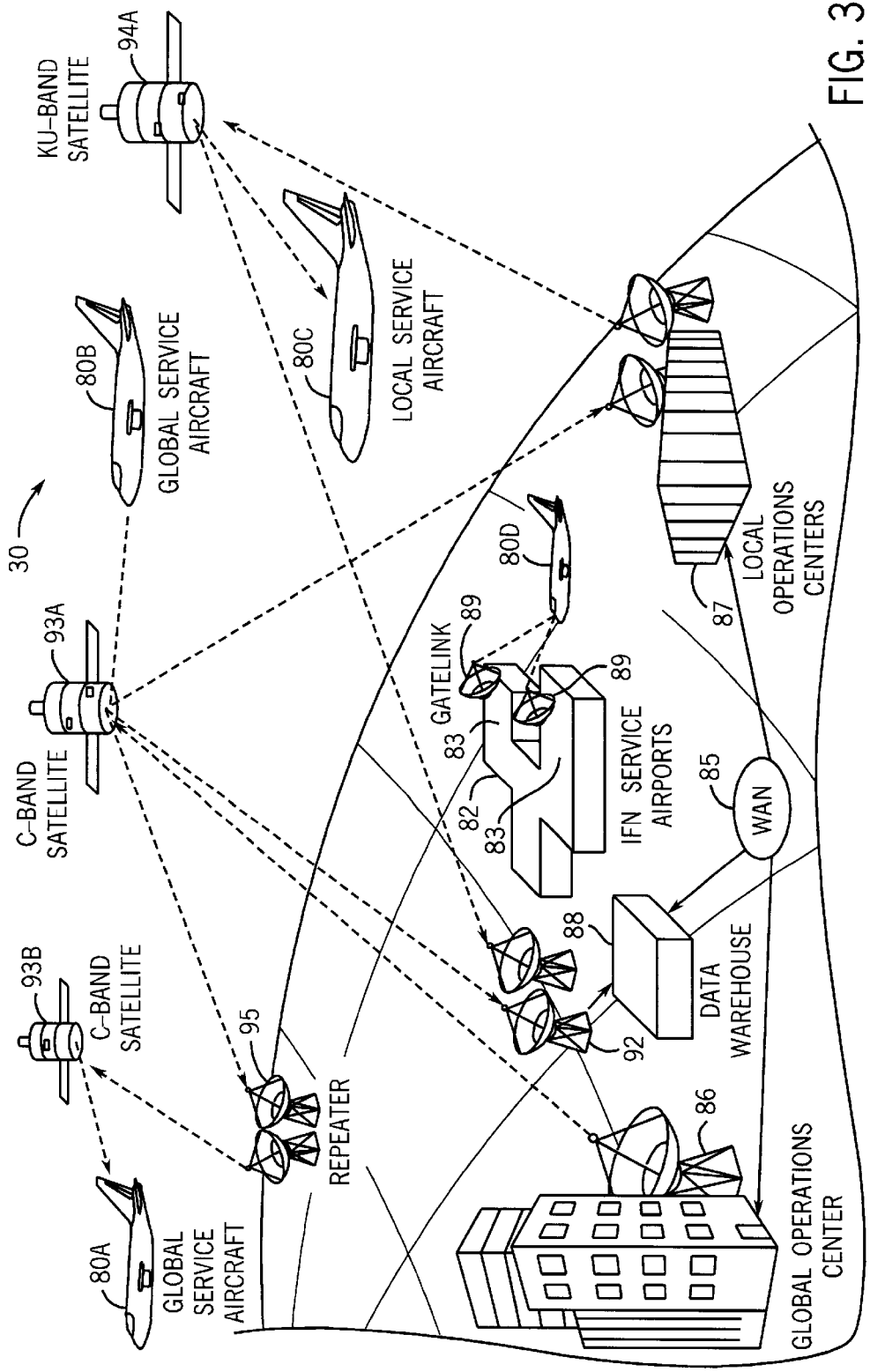
FIG. 3 is a general schematic block diagram of the communication system illustrated in FIG. 1, the communication system is configured for mobile platforms embodied as airplanes.

With reference to FIG. 3, communication system 30 is utilized in an application related to air travel. Mobile platforms 35 (FIGS. 1 and 2) include airplane 80A, airplane 80B, airplane 80C, and airplane 80D. Airplanes 80A–D can be any type of vehicle including helicopters, propeller-driven aircraft and large commercial jet-powered aircraft and are exemplary to the operations of communication system 30. Airplanes 80A and 80B are shown as global service aircraft which are capable of transoceanic flight. Airplane 80C is shown as a local service aircraft capable of terrestrial or continental flight. Aircraft 80D is shown located at an airport terminal 82.

Airport terminal 82 includes gates 83 which are an embodiment of docking area 37 (FIG. 2). System 30 includes a wide area network (WAN) 85, a global operations center 86, a local operations center 87, and a data warehouse 88. Network 85 is coupled to global operations center 86, local operations center 87, and data warehouse 88. Data warehouse 88 can be located anywhere including in operation center 86, operation center 87, or terminal 82. Airplane 80D, while parked at gate 83, can receive information from data warehouse 88 through a gate link 89 associated with gate 83.

Data warehouse 88 can receive data such as video data from WAN 85 as well as from satellite receiver 92. Satellite receiver 92 can receive signals from a first constellation satellites 93A and 93B and a second satellite 94. A repeater 95 can be utilized to provide signals to various satellites 93A–B.

Global operation center 86 can provide video signals of data to satellites 93A–B for direct reception by airplanes 80A–B. Similarly, local operations center 87 can provide video signals or data to satellite 94 for reception by airplane 80C. Airplanes 80A–B are typically transoceanic aircraft which receive the video data on C-band satellites as opposed to Ku-band satellites which are typically only located above terrestrial areas. Conversely, airplane 80C receives video data from Ku-band satellite 94 as opposed to C-band satellites 93A–B. Preferably, airplanes 80A–D have the capability to receive signals from satellite 94 and satellites 93A–B as well as the capability to switch between satellites 94 and 93A–B to maintain reception.

Data can be provided via satellites 93A–B at 1.5 megabits per second satellite 94A at 1.5 megabits per second upon multiple strains. Satellites 93A–B and 94 can also provide the video data to receiver 92 which provides it to data warehouse 88.

Data warehouse 88 allows a vast amount of data to be stored for provision into airplane 80D via wireless gate link antenna 89. In addition, warehouse 88 can store data downloaded from airplane 80D. Warehouse 88 can also store information from Internet 40 (FIG. 1).

Communication system 30 (FIG. 1) advantageously assures that occupants can receive continuous programming. For example, if reception of live news programs via satellites 93A–B or 94 is impossible, a previous news program may be shown which was stored on units 52 (FIG. 2) when the aircraft was parked at a gate. Alternatively, the previous news program could have been stored when received via satellites 93A–B and 94. Thus, occupants view the most current news program available. For example, during the 12:00 news report, reception may be impossible and an 11:30 or 11:00 news report which was stored on-board airplanes 80A–C may be utilized instead.

In addition, advertisements provided through gate link 84 can be timely and directed to occupants of a particular airplane 80D. This is a significant advantage over programs stored on tape where advertisements can be over three months old due to the delay associated with the manual delivery of the tape. In fact, the provision of video data by link 89 can be largely computer-controlled and co-ordinated so that the appropriate airplanes 80A–D receive the appropriate data at the appropriate time. In this way, personnel from one remotely located office (such as centers 86 and 87) can provide programming for fleets of airplanes 80A–D.

Programs and messages can be tailored for arrival and departure sites associated with airplanes 80A–D. For example, centers 86 and 87 can provide appropriate programs in appropriate languages based upon arrival and departure sites. Centers 86 and 87 can provide schedule information (e.g., order wire description below with reference to FIG. 8). The schedule information organizes the playing time, source, and content of programs and commercials uploaded and shown on aircraft 80D.

Figure 4:
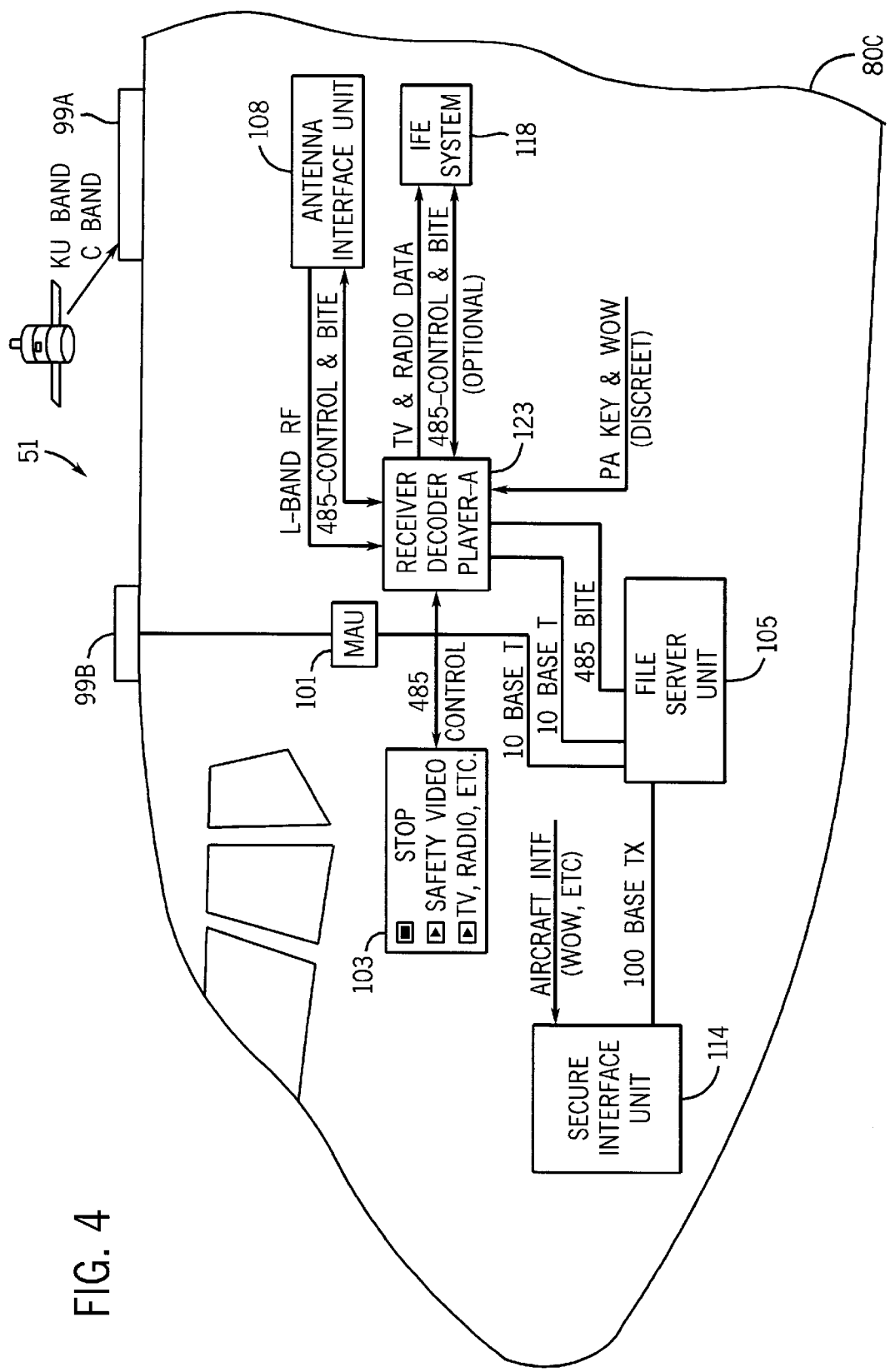
FIG. 4 is a more detailed schematic block diagram of a communication unit on-board one of the airplanes illustrated in FIG. 3.

With reference to FIG. 4, airplane 80D can be any of airplanes 80A–D in FIG. 3. Airplane 80D includes an antenna 99A for receiving satellite signals, a gate link antenna 99B for transmitting and receiving signals from antenna 89 (FIGS. 3 and 5), a media access unit (MAU) 101, user interface 103, a file server unit 105, a secure interface unit 114, an in-flight entertainment system 118 and an antenna interface unit 108.

Signals or video data from satellites are received on antenna 99A through antenna interface unit 108 by receiver decoder player 123. Receiver decoder player 123 can provide television and radio analog signals to in-flight entertainment system 118.

Receiver decoder player 123 receives control signals from a user interface 103 which allows a user to select the safety video, the television programs, radio programs, movies, as well as other media services. In addition, receiver decoder player 123 can receive signals from storage unit 52 (FIG. 1) which is embodied as file server unit 105. Control signals can be provided in a 10 Base T format, or 485 control format. Receiver decoder player 123 can provide the video data or signals in the various analog or digital formats to IFE system 118.

MAU 101 can provide 10 Base T signals to file server unit 105. MAU 101 controls the interface between link 89 (FIG. 3) and unit 105.

Secure interface unit 114 also provides aircraft informational signals to file server unit 105. File server unit 105 can provide signals through MAU 101 to gate link antenna 99B.

Secure interface unit 114 is necessary to protect air flight data from being accessed by passengers or other nonauthorized personnel of airplane 99D.

Antenna interface unit 108 can include a control for steering antenna 99A. Antenna 99A steering can be assisted by global positioning system-based (GPS-based) and inertial navigation system-based (INS-based) antenna steering mechanism. Alternatively, antenna 99A steering can be assisted solely by an INS-based antenna steering mechanism.

Figure 5:
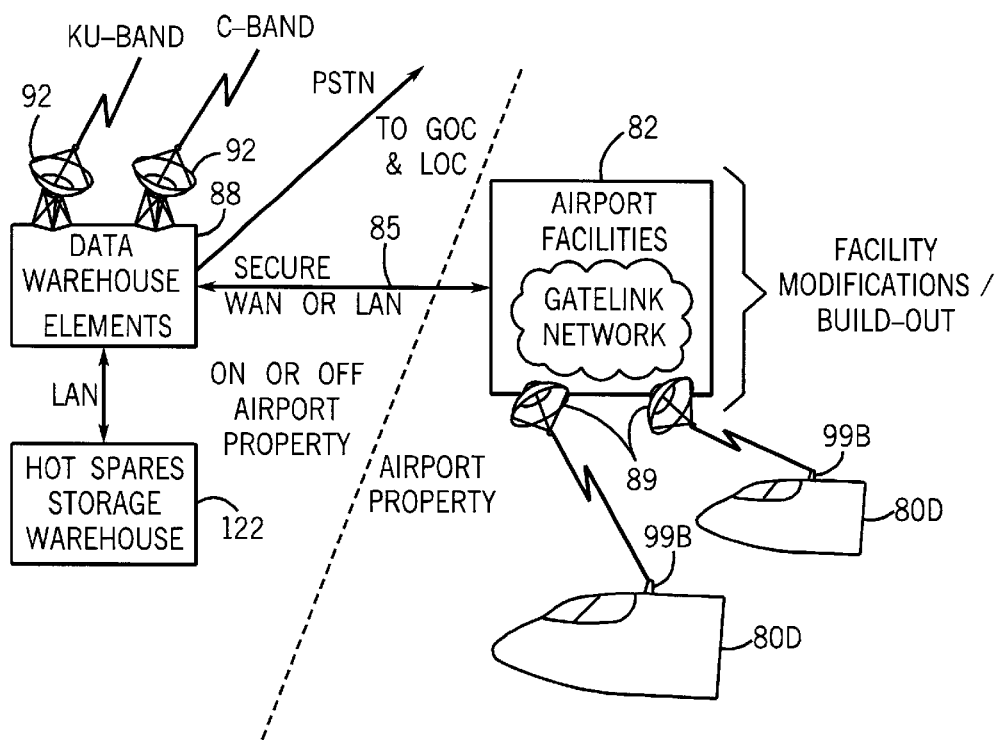
FIG. 5 is a more detailed schematic block diagram of a communication unit at a docking area associated with the airplane illustrated in FIG. 3.

With reference to FIG. 5, airplane 80D is shown in communication with airport terminal 82 via gate link 89. Gate link 89 is shown coupled to a gateway network coupled via WAN 85 to data warehouse 88. Warehouse 88 can also be coupled to a public switched telephone network or other wired connection. In addition, a LAN can be used to couple a hot spares storage warehouse 122 to warehouse 88. Hot spare storage warehouse 122 can be utilized to store replacement programs if particular programs are not available in data warehouse 88.

Thus, the exemplary embodiments of system 30 (FIG. 1) in FIGS. 3–5 provide a wireless airport gateway communications system for transmitting large amounts of data to an aircraft at an airport gate or gateway. The exemplary embodiments can also be used to remove data from the aircraft. The gate link system can be used to transfer the data to a storage system within an airport terminal or gate area and then to an aircraft when parked. The data can represent movies, Internet services, and satellite television programming.

Direct broadcast satellites are widely used to deliver television programming to large numbers of viewers without the need for a cable distribution system. Direct broadcast satellites can be used to deliver other data services such as interfaces to the Internet, facsimile, e-mail, weather reports, stock reports, and agriculture commodity information. Direct broadcast satellites are capable of delivering large volumes of data virtually anywhere in the world without a wired infrastructure.

Figure 6:
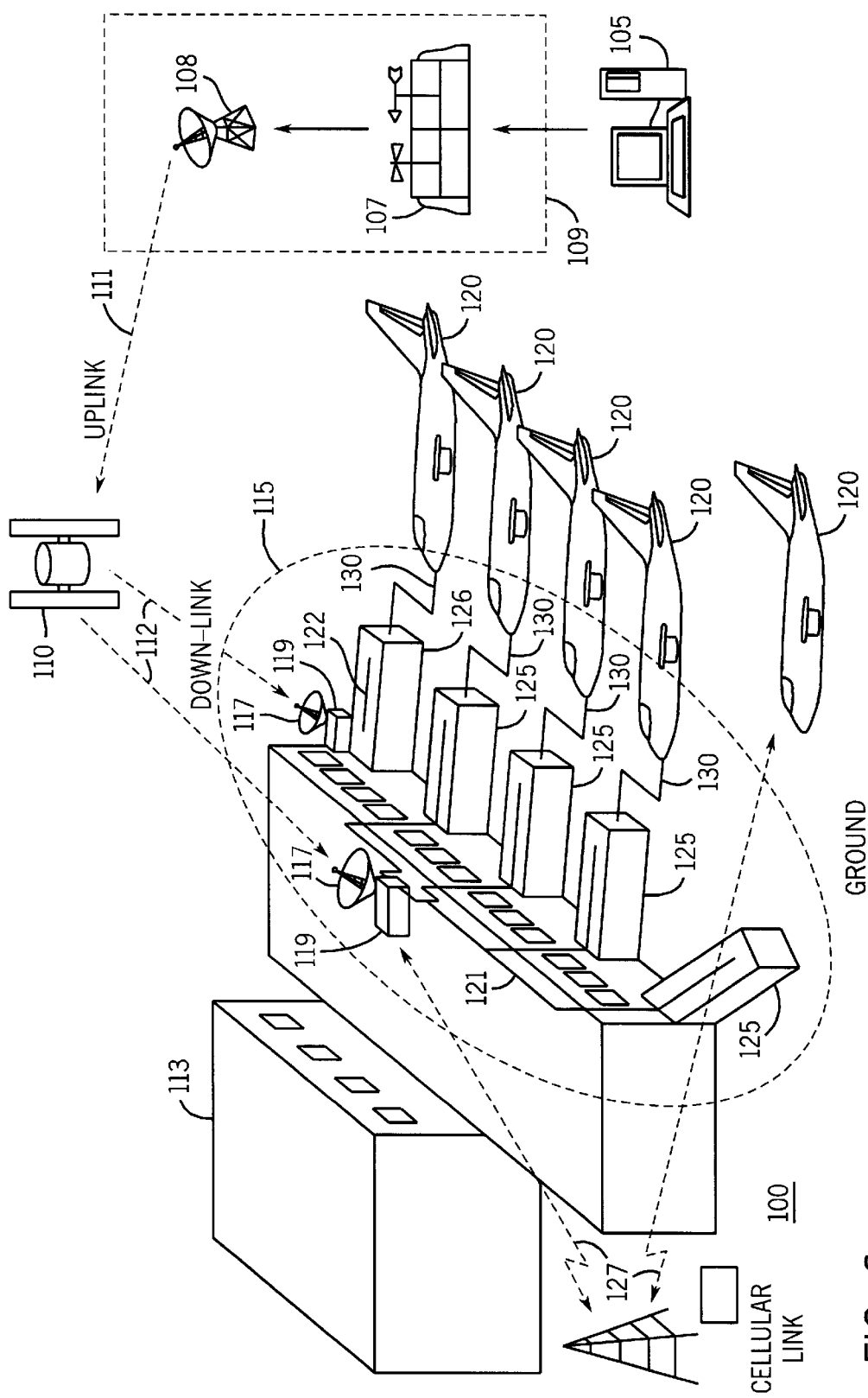
FIG. 6 is a general schematic block diagram of the communication system illustrated in FIG. 2, the communication system is configured for mobile platforms embodied as airplanes at an airport terminal.

Another example of communication system 30 is wireless airport gateway communications system 100 shown in FIG. 6. System 100 is installed at an airport terminal 113. A direct broadcast satellite 110 delivers video data such as Internet pages, television programming, and movies to a gateway ground station 115 for delivery to aircraft 120. One or more aircraft 120 located at one or more airport gateways 125 may utilize wireless airport gateway communications system 100. Direct broadcast satellite 110 receives data from a direct broadcast satellite (DBS) ground station 109. DBS ground station 109 uplinks the data to the DBS satellite typically on a uplink 111. DBS ground station 109 may include a network operations center 107 and an antenna 108. Data source 105 may be located with DBS ground station 109 and network operations center 107 or be remotely located with a communications link for sending data to be transmitted by ground station 109. Data source 105 may send data such as movies and other entertainment, maps, weather information, schedules, shopping guides, Internet, and any other data that may be of interest to passengers and crew on aircraft 120. Direct broadcast satellite 110 and DBS ground station 109 may be the same as those discussed below with reference to FIGS. 12 and 13.

Direct broadcast satellite 110 receives the data from DBS ground station 109 on uplink 111 and retransmits it on a downlink 112 to gateway ground station 115 located at airport terminal 113. Gateway ground station 115 may have an antenna 117 for receiving the data transmitted on downlink 112 by direct broadcast satellite 110. Also included with antenna 117 may be a down converter (not shown) for down converting the received direct broadcast satellite data signals to typically an L-band intermediate frequency (IF) data signal. A DBS satellite receiver and mass memory storage unit 119 may be located near antenna 117 and used for processing the L-band IF data signal to demodulate and store the data. The data from DBS satellite receiver and mass memory storage unit 119 may be distributed to aircraft 120 parked at gateways 125 over a terminal distribution system 121 and a wireless gatelink 130. The terminal distribution system may be an Ethernet, IEEE 1394, or other high-speed data distribution system.

An alternate embodiment of gateway ground station 115 may be to utilize one antenna 117 and down converter and to locate multiple DBS satellite receivers and mass memory storage units 119 at gateways 125. L-band (IF) data signal may be distributed over a coaxial cable terminal distribution system 121 to DBS satellite receivers and mass memory storage units 119.

Gateway ground station 115 may utilize multiple antennas 117 and DBS satellite receivers and mass memory storage units 119 installed at each of the gateways for data delivery to the aircraft 120. This embodiment is shown in exemplary fashion at gateway 126 in FIG. 7 and FIG. 8 and may be implemented at gateways 125 in FIG. 6. Having an antenna 117 and DBS receiver and mass memory storage unit 119 installed at each gateway 125 eliminates the need for terminal distribution system 121 in FIG. 6. An interconnection 122 from the DBS receiver and mass memory storage unit 119 to the wireless gatelink 130 is used to pass the data to the aircraft 120.

Figure 7:
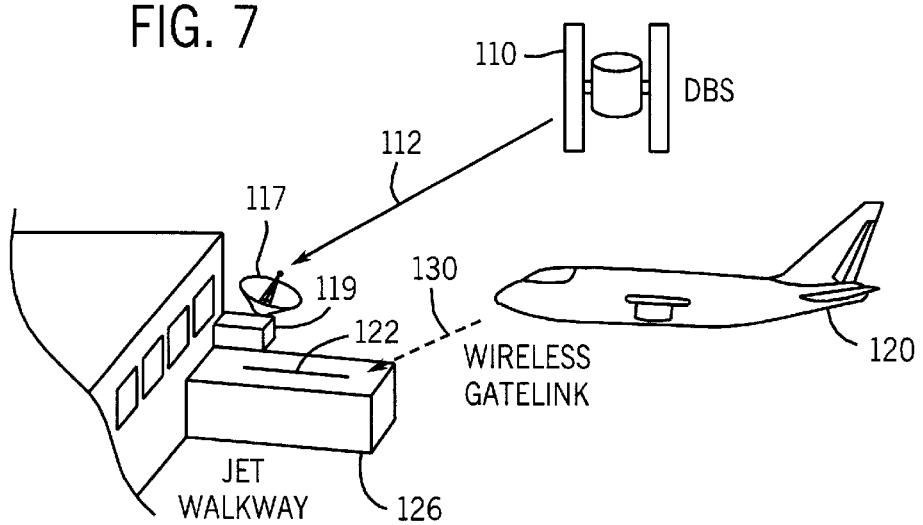
FIG. 7 is a more detailed schematic diagram of the communications system illustrated in FIG. 6.

Wireless gatelink 130 at each of the gateways 125 and 126 in FIG. 6 and 7 is used for transferring the data from DBS satellite receiver and mass memory storage unit 119 to aircraft 120 parked at gateways 125 and 126. When an aircraft 120 is parked at a gateway (125 or 126) and the aircraft door is opened, wireless gate link 130 transmits the data at a high data rate to aircraft 120. Alternatively, wireless gate link 130 can be a longer range system capable of communicating with aircraft 120 when it is taxiing or roving.

Wireless gatelink 130 can be a very short-range (several feet to a few meters) high-speed radio data link or a high-speed optical data link (FIG. 8). The open aircraft door serves as a temporary short-haul, low-loss conduit simultaneously eliminating the need for an external aircraft antenna, providing an automatic untethered connection, maximizing file transfer speed due to the short distance and proximity of radio antennas or optical sensors and allowing frequency re-use from gate to gate by the use of very low transmit power levels and reasonably predictable gate/aircraft conduit shielding effects. In addition, small-scale (less than several inches) antennas can be utilized because of the short range and protected nature of the "door open" communication scheme. The antenna can be small dish antennas (less than several inches in diameter) or probe antennas. Wireless gatelink 130 may also transmit the data to an antenna (not shown) embedded in the skin of the aircraft 120. Wireless gatelink 130 may employ communications protocol layers and security layers ensuring error free and secure data transfer.

Wireless gatelink 130 of FIGS. 6 and 7 may also receive data from aircraft 120 while the aircraft door is open (FIG. 8). The aircraft data may include FOQA data, passenger shopping credit card charges, passenger media use statistics, ground transportation requests, hotel reservation requests, merchandise orders, and any other data that may be generated by passengers and crew on-board aircraft 120 during flight and taxiing. The aircraft data received by wireless gatelink 130 may be sent to mass memory storage unit 119 where it may be stored and then forwarded to a data recipient (not shown) or may be directly forwarded automatically to the data recipient. The data recipient may be located in the gate area, elsewhere at airport terminal 113, or remotely located anywhere worldwide. The aircraft data may be sent to the data recipient over telephone lines, a cellular link 127 in FIG. 6 or some other communications link. The data recipient may be an airline office, a credit card company, a hotel, a taxi service, or any other recipient appropriate to the data generated on-board the aircraft 120.

An alternative embodiment to the embodiments shown in FIGS. 6 and 7 is installed at gateway 126 as shown in FIG. 8. In FIG. 8, DBS satellite receiver and mass memory storage unit 119 (FIGS. 6 and 7) is located near the aircraft at the end of gateway 126 and included as part of a gatelink store and forward media storage server 131. In this embodiment, interconnection 122 consists of a coaxial cable passes the L-band IF data signals from antenna 117 and down converter (not shown) to gatelink store and forward media storage server 131. Gatelink store and forward media storage server 131 transmits the data to aircraft 120 parked at gateway 126 on wireless gateway link 130. An aircraft gatelink media file server 135 in aircraft 120 receives the data and stores it in an aircraft mass memory storage unit within aircraft gatelink file server 135 to later send to an in-flight entertainment system (not shown) or other data distribution system (not shown) on-board aircraft 120.

Aircraft gatelink media file server 135 may also transmit the aircraft data from an aircraft mass memory unit (not shown) within aircraft gatelink file server 135 on-board aircraft 120 over wireless gatelink 130 to gatelink store and forward media storage server 131.

Figure 9:
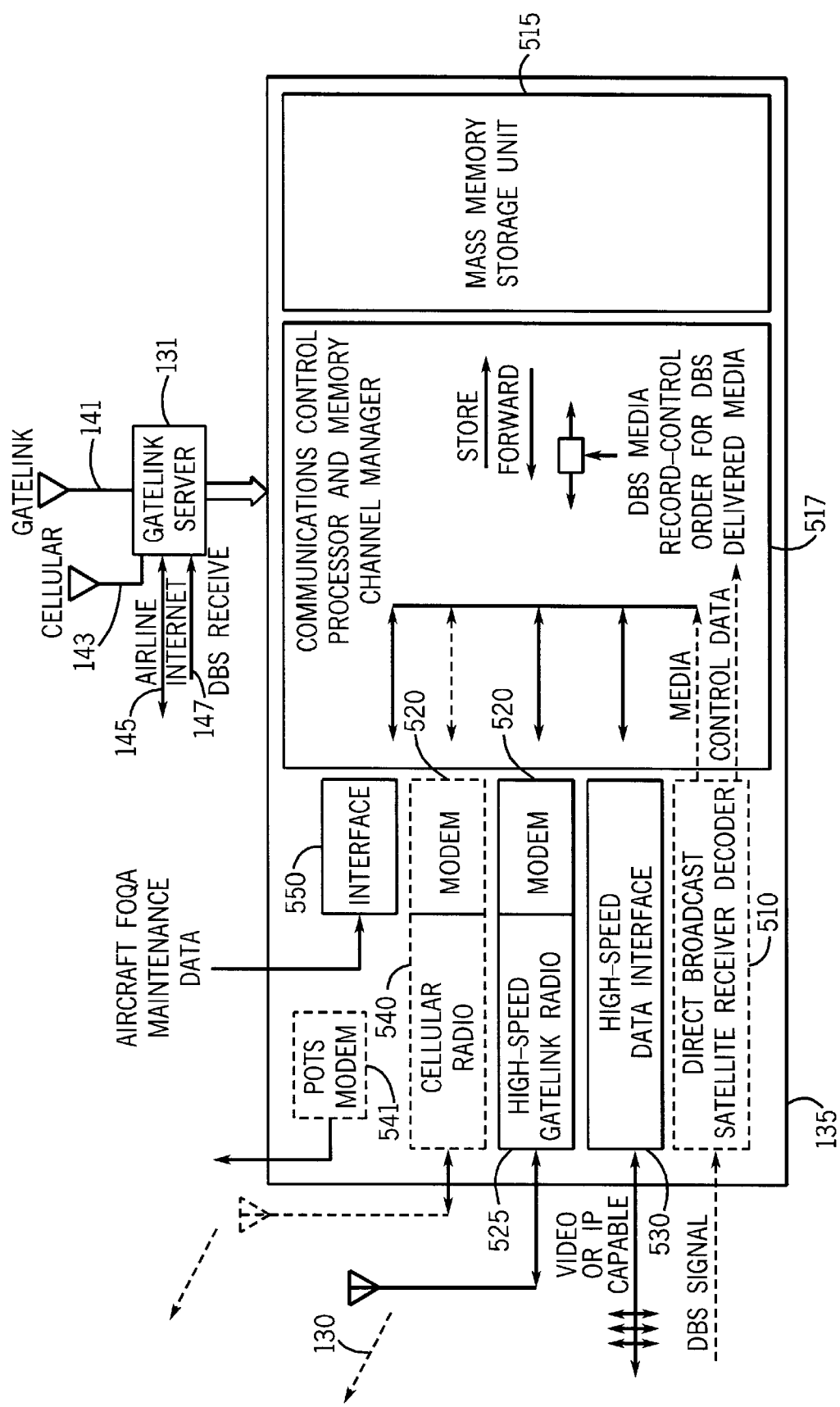
FIG. 9 is a more detailed block diagram of a media file server for a mobile platform, the media file server is embodied as an aircraft media file server for the communications system illustrated in FIG. 6.

FIG. 9 is a general block diagram of gatelink store and forward media storage server 131. Gatelink store and forward media storage server 131 includes a direct broadcast satellite receiver 510 and a mass memory storage unit 515 shown together in FIGS. 6 and 7 as unit 119. A DBS data signal at an L-band IF frequency is received from the antenna and down converted by the DBS satellite receiver 510. DBS satellite receiver 510 demodulates and decodes the data signal. The data signal may include movies and other entertainment, maps, weather information, aeronautical charts, Internet web sites, schedules, shopping guides, e-mail, fax, and any other data that may be of interest to passengers and crew on aircraft 120.

In FIG. 9, a communications control processor and memory channel manager 517 routes the data received from DBS receiver 510. A program order wire included with the data at data source 105 (in FIG. 6) and transmitted with the data may be used to entitle, queue, and control using the communications control processor and memory channel manager 517, mass memory storage unit 515 what data to store, from a channel, at a given time. For example, the order wire data may entitle mass memory storage unit 515 to store a movie on a certain channel that has been ordered and paid for a particular aircraft or group of aircraft and is sent over wireless airport gateway communications system 100.

The order wire allows programming on each individual aircraft 120 to be controlled by a central location. The order wire enables system 100 to operate as essentially an affiliate television station on-board each of aircraft 120. The order wire can set the content, time, and source of programs available on each of aircraft 120. Further, the order wire can direct the reception of live and near-live broadcasts. In one example, the order wire can direct the playback of a game which has been stored in unit 515. In another example, the order wire can direct the playback a game which is in progress when aircraft 120 is parked at gateway 125. The first 30 minutes of the game could be played back from unit 515 while the remainder of the game is received from satellite 240. Thus, the order wire can ensure property synchronization of the playback of programs.

Gate link store and forward media server 131 includes gate link antenna 141, a cellular antenna 143, an airline Intranet channel 145, and a DBS receive channel 147. Server 131 can include a radio for gate link 130, a cellular radio for communication with cellular radio 540, as well as, storage medium for movies, Internet data, and other data. The information received at DBS receive channel 147 can include a digital feed from a DBS satellite dish antenna including satellite media programming and order wire information. Information on DBS receive channel 147 can be divided into a user and order wire channels which have priority and core data programming channels which have variable bandwidth. User and order wire channels can include 56K modem Internet user channel, 28.8 kilobit per second Internet user channels, a 28.8 kilobit per second FTP channel, a 28.8 kilobit per second fax channel, a 4800 kilobit per second voicemail channel, as well as, other information. The various channels can use NATS or INMARSAT backchannels as described below.

The data in storage in mass memory storage unit 515 in FIG. 9 is transferred to aircraft 120 parked at gateway 125 when the door is opened over the wireless gatelink 130. The door can be any panel or covered opening on aircraft 120 including a cargo door, cabinet, or a passenger door. Gateway store and forward media storage server 131 includes modem 520 and a high-speed gatelink radio 525 for transferring the date over wireless gatelink 130. The placement of the antenna for gate link 130 behind a door inside aircraft 120 eliminates wind resistance issues associated with an external antenna. The antenna is placed inside aircraft 120 because it is only accessed when aircraft 120 is parked.

Gatelink radio system 525 may also be used to receive data from an aircraft over wireless gatelink 130. Aircraft data received by gatelink radio 525 is passed through the communications control processor and memory channel manager 517 to mass memory storage unit 515 where it may also be stored along with the data received by DBS receiver 510. The aircraft data may be sent immediately or recalled from mass memory storage unit 515 when requested and then sent through an Ethernet modem 430 and over an Ethernet or through another modem 520 and cellular radio 540 over a cellular telephone link 127 (in FIG. 6) to a data recipient. Cellular radio 540 and Ethernet modem 530 may also be used to receive data from the data recipient. In addition, server 131 can include a POTS modem 541 for connection to server 131 or other available POTS (plain old telephone service) connections.

Wireless gatelink 130 may be an optical communications link (e.g. infrared or ultraviolet) and high-speed gatelink radio 525 may be replaced with optical communications equipment. Preferably, wireless gatelink 130 is a channel in the Unlicensed National Information Infrastructure (U-NII) bands (e.g., 5.15–5.35 $GH_z$–50 mW, 5.25–5.35 $GH_z$–250 mW, or 5.725–5.825 $GH_z$–1 W). Alternatively, the channel can be an ISM frequency hopping (FH) direct sequence spread spectrum (DSSS) (5725–5850 $MH_z$–1 W), (5725–5875 $MH_z$–1 mW).

Aircraft media file server 135 of FIG. 8 is shown in detail in FIG. 9. Aircraft gatelink media file server 131 is also shown in more detail in FIG. 9. One or more direct broadcast satellite receivers 510 may be included in aircraft media file server 135. DBS receiver 510 may be connected to an aircraft direct broadcast antenna system 261 to receive L-band IF data signal as described below with reference to FIG. 11. The DBS receiver may be used to receive DBS television programming, Internet services, and any other programming broadcast by DBS satellite 110 of FIGS. 6 and 7. The output of DBS receiver 510 is passed through an aircraft communications control processor and memory channel manager 517 to an aircraft mass memory storage unit 515 for later distribution or passed to a high-speed data interface 530 for immediate distribution on-board the aircraft over an aircraft intranet, an aircraft media distribution system, or in-flight entertainment system (not shown).

An aircraft high-speed gatelink radio 525 in FIG. 9 receives data over the wireless gatelink 130 from gatelink store and forward media storage server 131 of FIGS. 7 and 8. The data is passed through the aircraft communications control processor and memory channel manager 517 to aircraft mass memory storage unit 515 where it is stored until called for during flight or at any other needed time or the data may be passed to high-speed data interface 530 for immediate distribution on-board aircraft 120 as described above.

High-speed data interface 530 of FIG. 9 may receive data from the aircraft 120 during flight or taxiing for storage in aircraft mass memory storage unit 515. An interface 550 may be used to receive aircraft FOQA (flight operations quality assurance) data and pass FOQA data through aircraft communications control processor and memory channel manager 517 for storage in aircraft mass memory storage unit 515. The aircraft data in the aircraft mass memory storage unit 515 may be transferred through aircraft communications control processor and memory channel manager 517 to a modem 520 for transmission over high-speed gatelink radio 525 and wireless gatelink 130 to gatelink store and forward media storage server 131 of FIG. 8. A cellular radio 540 and modem 520 may be used to send data and receive aircraft data at aircraft 120 over cellular telephone link 127 of FIG. 6.

Figure 10:
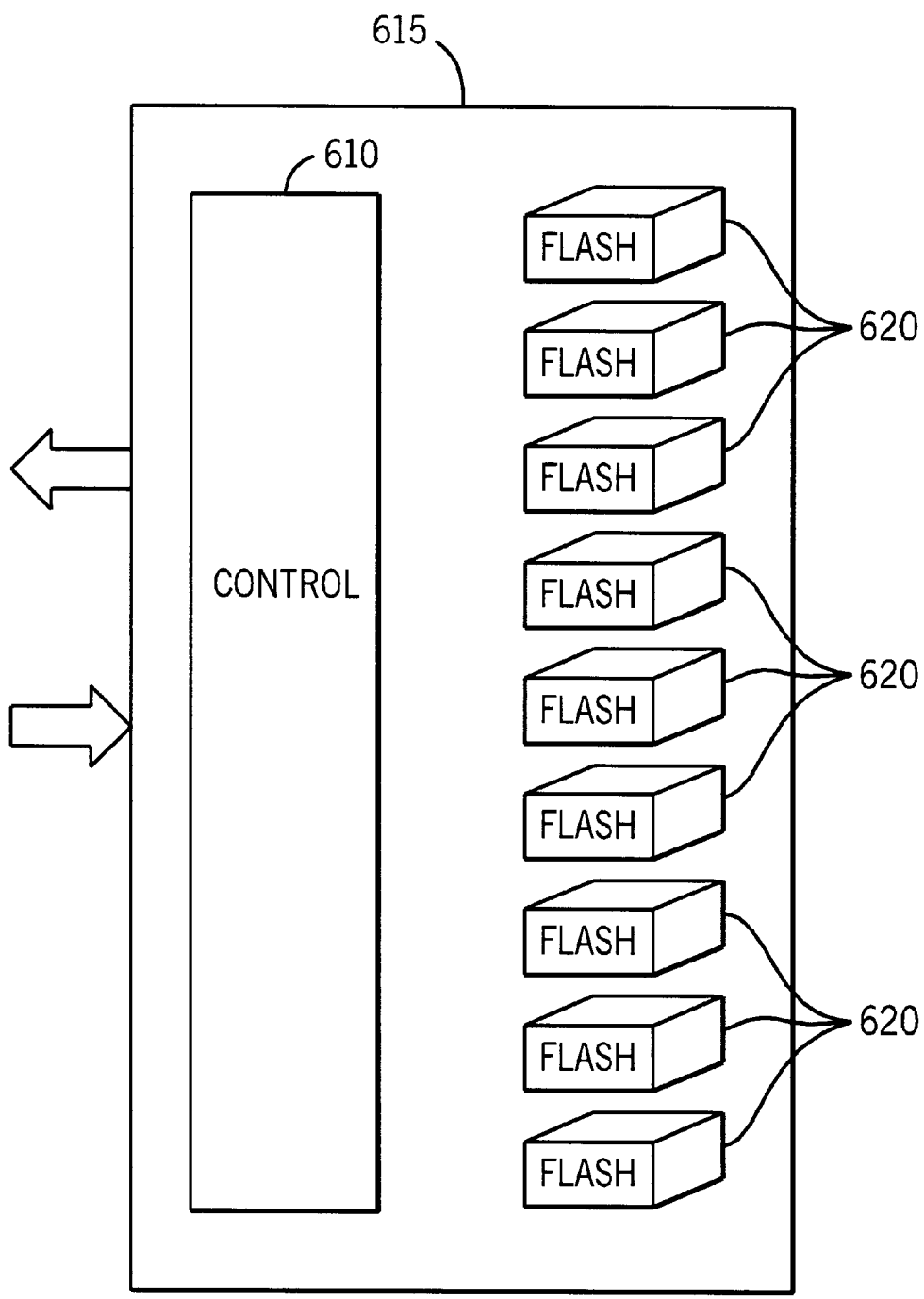
FIG. 10 is a more detailed block diagram of an alternative embodiment of mass memory storage unit for the media file server illustrated in FIG. 9.

Mass memory storage unit 515 in FIG. 9 and aircraft mass memory storage unit 125 of FIG. 8 are shown in detail as unit 615 in FIG. 10. Mass memory storage unit 615 may utilize FLASH memory, RAID (redundant array of inexpensive disks) architecture, holographic memory, a combination of these memory technologies or any solid state memory technology capable for storing many gigabytes. Shown in FIG. 10 is a memory control 610 for controlling the loading and retrieving of data from the memory. Mass memory storage unit 615 as shown in FIG. 10 is made up of several FLASH memory modules 620. FLASH or solid-state memory requires no mechanical seek time, allowing a new architecture that provides higher-speed read/write cycles and multi-user random access. Current access time to standard hard disk media is approximately 1 millisecond. Access time for a semiconductor FLASH memory does not require the significant seek time of a mechanical disk. FLASH access time is limited by semiconductor speeds typically in the 100 us range. This is 10 times the speed of a mechanical drive. A media delivery memory architecture as used in this embodiment differs from other hard disk based memory architectures in that significantly many more times as many users are allowed random access to the same media content. Additionally, this architecture enables the use of high speed radio links 130 (FIG. 9) for high speed video transfer.

As described with reference to FIGS. 2–10, embodiments of system 30 advantageously remove and deliver data from and to aircraft 120. Aircraft 120 parked at gateway 125 at an airport terminal 113 presents a unique opportunity to transfer large amounts of timely data. File sizes reaching 100s of gigabytes involving media such as movies, television programming, news, and Internet web pages can be transferred while aircraft 120 is parked. Data transfer can be conducted without physically handling of media. Physically handling of media many times results in loss, breakage, theft, and schedule and maintenance issues. Furthermore, wireless high-speed data transfer eliminates a manual connection to aircraft 120. Data to be transferred to and from the aircraft when parked can be stored at the airport gateway until the aircraft arrives.

With reference to FIG. 9, server 131 can allow important passenger functions, such as, delivery of data to outside sources via cellular radio 540. For example, passenger information, such as, credit card information, hotel reservation information, and other travel information can be provided through cellular radio 540 as a passenger is on aircraft 120. High speed gate link radio 525 allows aircraft 120 to receive movies, selected Internet web pages, ads and home page updates. The various types of video data can be stored on unit 515 utilizing DBS and other COM link storage techniques. For example, a RAID (redundant arrays of inexpensive disks) architecture can be utilized, as well as, flash memory hardware as discussed above with reference to FIG. 10. Unit 515 can store Internet web pages and advertisements, movies, news, sports, streaming audio, streaming video, FOQA data, e-mail, fax, voicemail, page/cell/phone messaging, as well as, passenger information.

Adding Internet service to a high-power wide-band direct broadcast satellite (DBS) system for mobile platform use is therefore a desirable solution as it provides both a wireless means of connectivity to the aircraft and offers much higher bandwidth than existing low-bandwidth communications systems. The same direct broadcast satellite system can be used to simultaneously receive live television broadcasts and high-speed Internet service. Bandwidth for aircraft Internet users can come from idle capacity on high-power direct broadcast satellite transponders not fully used by video broadcasts. A typical DBS satellite may have 16 transponders, each with the capability of supporting up to 30 megabits per second, these transponders may each support several television channels. Each television channel may require 2 to 12 megabits per second. Depending on satellite transponder usage, several hundred kilobits to megabits may be available with access provided via a single television/data receiver system. Availability of this type of bandwidth is modest, fitting a limited user aviation market base well, where otherwise commercial market uses would generally out grow or require much more capacity. Some direct broadcast satellites blindly broadcast forward Internet data. Other interactive Internet and data service satellites are targeted to mass markets requiring significant satellite transponder usage, have lower EIRP (effective isotropic radiated power) signal strength and are narrowly spaced in frequency reuse and geostationary orbit, requiring relatively high gain large antennas at the receiver, making these services a suboptimal option for aviation. Furthermore, the business case for mixing low-cost Internet browsing channels for casual use with high-cost media company digital TV channels is not strong, therefore there is currently low incentive to have both full interactive Internet channel capability and television placed on the same satellite. Additionally, while relatively large antennas are acceptable in ground installations, these larger profile antennas would not be easily installed on aircraft or desired since they would adversely affect fuel efficiency.

Internet service may be in two forms. One form is broadcast or "push" Internet. Broadcast Internet is similar to a television station with the programming pre-arranged and continuously delivered. A computer addresses stored and real-time Internet broadcast data similar to tuning to a television channel. Broadcast Internet can be provided over portions of a direct broadcast satellite television transponder channel. Full interactive Internet is the other form where a user requests or addresses an Internet site and receives or downloads the resulting data from the site for viewing. This interactive form of the Internet is most common and desirable. In addition to a direct broadcast satellite, interactive Internet requires an additional communications channel from the aircraft user to the Internet to accomplish this. A direct broadcast satellite television channel does not provide a needed back-channel air-to-ground communications link hence requiring a split communications approach.

The aircraft satellite communications system in the embodiments of FIGS. 11–14 distribute television programming, Internet service, and other data services from direct broadcast satellites. The aircraft satellite communications system can be used for Internet service only or for television programming and Internet service. The aircraft satellite communications system can be used to add Internet service to the aircraft direct broadcast satellite television system currently manufactured by the assignee.

The Internet is a network of millions of computers all over the world connected through many telephone systems and other means. The interconnection is collectively known as the Internet backbone. The Internet uses a network protocol called TCP/IP (transmission control protocol/Internet protocol). Every computer connected to the Internet uses TCP/IP to send to and receive data from other computers on the network. TCP/IP is a packet-switched network protocol. TCP breaks down the data message to be sent into smaller portions of data called packets with an address of both the sender and the receiver of the message. The IP protocol is used to transfer the data from the sender to the receiver through a series of routers. The routers receive a data packet, examine the destination address, and pass the data packet to the next router until the final destination is reached. The individual data packets are reassembled at the receiver using TCP to reconstruct the original message. The World Wide Web is a subset of the Internet and is a collection of linked Web sites that use an Internet protocol called HTTP (hypertext transfer protocol) to work together. HTTP is used to exchange text, images, sound, and video. Web site pages are exchanged by browsers that read the pages and servers that store the pages. Individual Web pages are combined to make up a Web site. The Web pages are written in HTML (Hypertext Markup Language). Hyperlinks connect Web pages to one another. The Web uses an addressing scheme that has an individual IP address to identify specific computers connected to the Internet. To get to a specific Web page on the Internet a precise address known as the URL (Uniform Resource Locator) is used. The URL tells the browser where to go on a server to find a desired Web page. The Internet works interactivity in a pulled mode where a browser looks at a Web page by going to the Web server where the page is stored and pulls it to the recipient computer for viewing. In the push or broadcast mode, the data arrives at a computer much like a television broadcast and the browser tunes to the broadcast. Several broadcasts may be available with different program data or media content. Current direct broadcast satellite systems for delivering Internet service to a terrestrial receiver require a dish antenna of typically 18 to 35 inches in diameter at the client.

Antenna design is generally optimized to satellite transponder power levels and the adjacent geostationary satellite spacing. For normal ground receiver use, these modest sized high-gain antennas (18 to 35 inches) are generally required for satellite broadcast EIRP levels in the low to high 40-dBW range. In contrast, airborne antennas must be as small and conformal to the fuselage as possible, especially on jet aircraft where drag must be minimized and installation space is limited. Antenna sizes currently used in direct broadcast satellite television systems installed on aircraft for in-flight entertainment systems typically range from twelve-inches to several feet in diameter. Most practical antenna aperture sizes for aircraft use are inadequate for use with current high speed satellite Internet services hosted on lower power two- to three-degree frequency spaced geostationary satellites. As with digital television, higher power satellite transponders (50 dBW or greater) on satellites with wider nine-degree spaced frequency reuse are desired to reliably provide Internet service to aircraft equipped with small antennas. Many Ku-band direct broadcast satellite television satellites are generally in a regulated class that deliver the needed higher power and retain wider geostationary frequency reuse orbit spacing ideally suited for aircraft antenna systems.

Figure 11:
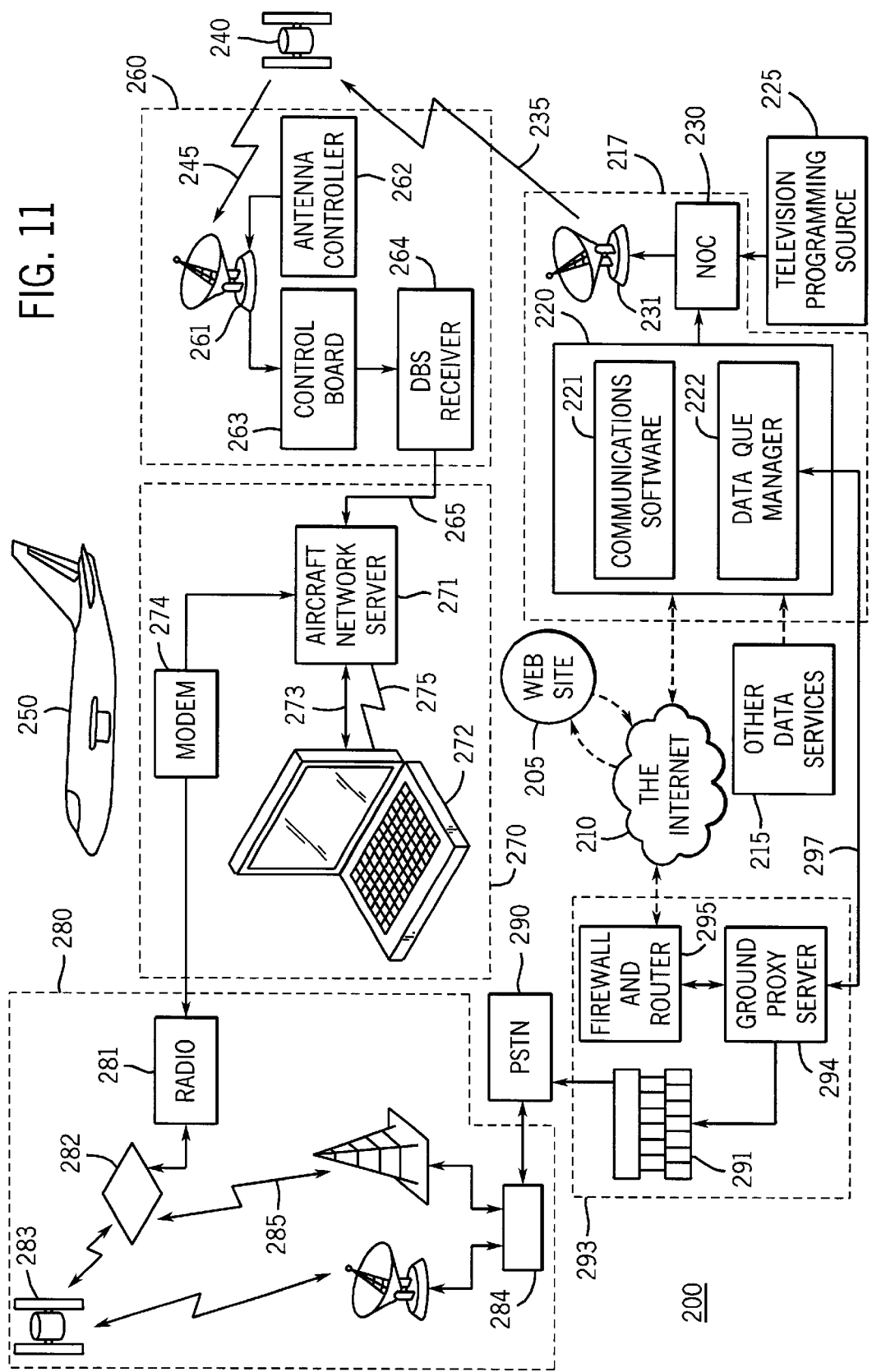
FIG. 11 is a general schematic block diagram of a satellite communication system for distributing television programming and Internet service from direct broadcast satellites to a mobile platform embodied as an aircraft communication system for an airplane.

An embodiment of the current invention for delivering Internet service, television, and other data services to aircraft is shown in FIG. 11. Aircraft satellite communications system 200 uses one or more high-power DBS television satellites, which allow the simultaneous forward reception of push, interactive Internet data and television programming to an aircraft antenna and receiver system from the same satellite. In FIG. 11 a direct broadcast satellite ground station 217 forms a major part of the communications system and may include a communications data content aggregator 220, a network operations center 230, and an antenna system 231. Communications center data content aggregator 220 interfaces the Internet 210. Communications center data content aggregator 220 can function as an aviation Internet service provider (ISP) just as receiver 50 (FIG. 1) can function as a television station (affiliate) for platform 35. In addition to interfacing the Internet 210, the communications center data content aggregator 220 may interface other dedicated data services 215 such as facsimile, e-mail, weather reports, stock reports, and agriculture commodity information. Communications center data content aggregator 220 contains communications software 221 that responds to a unique address code associated with a URL request from a client computer or PC (personal computer) or other computing device 272 received over a communications back-channel 280. The URL request instructs data content aggregator 220 or another ISP (not shown) to acquire and deliver Internet data to a network operations center 230 for uplinking to a direct broadcast satellite 240 for delivery to client computer 272 on-board an aircraft 250 having same unique address code. The satellite communications system of the present embodiment may be used with more than one aircraft 250. More than one client computer or computing device 272 may be located on the aircraft 250. A data queue manager 222 schedules the data for each of data services 215 or Internet 210 on queue according to a pre-established priority. Data is forwarded over a dedicated telephone, microwave link, or some other means to direct broadcast satellite network operations center 230. Network operations center 230 sends Internet service and other data services to a satellite 240 on an uplink 235 using antenna system 231. A number of satellites 240 can be used to increase the geographical coverage or to offer additional channels. An aircraft in flight may switch from one satellite to another as determined by the coverage of each satellite and aircraft position as determined from available navigation systems. Regular direct broadcast satellite television programming may also be uplinked on a number of channels to a satellite 240 from a television programming source 225.

Satellites 240 transmit forward Internet service aspects along with the other data services and the regular direct broadcast satellite television programming on a DBS down link 245 to aircraft 250. Dynamic allocation of the bandwidth of the DBS down link channels between core programming and client computer 272 Internet users is maintained by data queue manager 222. This dynamic allocation is done to assure that the bandwidth of the DBS channels never sits idle, maximizing revenue opportunity for an Internet service provider. A core set of programming is typically delivered to the aircraft 250 regardless if requested or not by a client computer 272. Core programming is defined as popular Web sites and other popular data services broadcasted and stored for random client retrieval. These pages are scheduled, updated, and replaced automatically. When a client computer 272 requires use of a portion of the bulk fixed contracted DBS down link bandwidth, channel priority is assigned to client computer 272. Assigned channel priority results in temporarily reduced core programming delivery until client computer 272 relinquishes the channel back to core programming. This assignment is done in real-time and is dynamic for any sized DBS channel usage and rate within the fixed DBS channel. The result is that this fixed DBS bandwidth is always in use allowing continuous revenue generation opportunity either from individual Internet users or from core programming content or advertising sponsors.

Communication system 200 can advantageously utilize the principles of system 30 and receive the order wire data when parked at docking area 35 (FIG. 2). The order wire data can include default homepage information, and HTML advertising spots (or directions to such home pages or spots). For example, the order wire data can program computers 272 or server 271 to provide a default homepage when Internet browsing begins. According to another example, the order wire data can direct server 271 or computer 272 to provide particular HTML advertising spots. The order wire data can select advertising spots and default homepages in response to the destination of aircraft 250. Alternatively, the order wire data can select the advertising spots and default homepages in response to aircraft type, weather conditions, the number of passengers on the flight associated with aircraft 250, or the origination of aircraft 250.

Thus, system 200 can advantageously provide an electronic browsing operation where advertising spots and default home pages are selected through the order wire data. The order wire data can include the entire home page or simply an address of the home page. Similarly, the order wire data can include the HTML advertising spots or address for such advertising spots. Preferably, advertising spots can be stored on board the mobile platform such as aircraft 250. The order wire data can control computer 272 or aircraft network server 271 so that the default home page information and HTML advertising spots are appropriately provided during electronic browsing services.

In FIG. 11, aircraft 250 contains the equipment needed to receive the Internet service, other data services, and direct broadcast satellite television programming. A direct broadcast satellite receiver system 260 can be used as shown in FIG. 11 to just receive Internet service or to receive DBS television broadcasts and other data services as well. In an aircraft DBS receiver system 260, an antenna and antenna interface unit 261 receives the signals from the satellites 240. The antenna is mounted on the antenna interface unit to form the assembly 261. The antenna may be a dish antenna or an electronically beam-steerable antenna. The antenna and antenna interface unit 261 down converts the satellite signals into a 950 to 1450 MHz or L-band intermediate frequency (IF) signal. An antenna control unit 262 positions the antenna beam to track the satellite as aircraft 250 maneuvers. A direct broadcast satellite receiver control board 263 allows control of the aircraft system receiver operation. The down converted L-band IF signal is sent to direct broadcast satellite receiver 264 for processing of the Internet service and other data services. DBS satellite receiver 264 may be configured to receive television programming as well as Internet and other data services. The direct broadcast satellite television programming or Internet service may be sent to an in-flight entertainment system as described in conjunction with FIG. 13.

The Internet service data from the satellite receiver is passed on a serial data bus 265 to an aircraft computer network 270. Internet service may also be distributed over an aircraft in-flight entertainment described in conjunction with FIG. 13. The aircraft computer network includes a network server 271 that distributes Internet service and other data services in the aircraft 250 over an universal serial bus (USB) bus, Ethernet or serial data bus 273 such as IEEE 1394. Client personal computer 272 may be connected to data bus 273 or wireless network 275 for browsing the Internet.

The system configuration described up to this point in conjunction with FIG. 11 is suitable for broadcast or push Internet use only. If full interactive Internet is desired, some means of communicating from the client computer or personal computer (PC) or other user computing device 272 to the Internet 210 is required to make browser URL requests. The means of communicating with the Internet 210 can be in the form of a communications back-channel 280. The URL requests from the client computer 272 may not be in TCP/IP protocol due to current sub-optimal back channel bandwidth limitations. Future back-channel communications systems may supply the required bandwidth for true TCP/IP support. With current communications links, the client computer 272 is pre-assigned a fixed unique client address by the aircraft network server related to the current DBS satellite in use or tuned to, the aircraft tail number, a random user number or seat number, flight number, global position (if available), and date that a switch center 293 on the ground recognizes as an entitled user. A currently available back-channel communications system 280 is a SATCOM system such as INMARSAT. A phone radio 281 and associated antenna 282, on-board aircraft 250, transmit URL request data with fixed user ID to a SATCOM satellite 283 to an appropriate back-channel ground station 284. Back-channel communications system 280 may also be used for other data. Back-channel radio communications system 280 may also be a high frequency (HF) or a very high frequency (VHF) terrestrial communications link such as the AT&T NATS In-flight Telephony Network. The bandwidth of currently available VHF links is generally intended for voice also limiting the practical use of TCP/IP protocol on the link as is the case with current low-speed SATCOM data links. Many back-channel ground stations 284 may be required across a geographical area to provide the needed contiguous coverage.

The URL request data inputs from the back-channel communications system 280 is passed over a telephone system such as the public switch center 293 to access Internet 210. Telephone system 290 may be connected to an existing Internet service provider (ISP) (not shown) to interface Internet 210. Telephone system 290 may also be replaced with a microwave link, a direct line, or some other means of communicating with switch center 293. The back-channel ground station 284 may be collocated with switch center 293 eliminating the need for a communications link. At switch center 293, a telephone line switch 291 selects URL request data inputs to the switch center from back-channel ground stations 284 connected to the various back-channel communications links with signals originating from multiple aircraft and client users of the system. Telephone line switch 291 outputs are connected to a ground proxy computer 294. Ground proxy computer 294 is a proxy server that acts as an intermediary between client computer 272 and Internet 210 and essentially hosts the actual Internet sessions desired by client computer 272. Ground proxy computer 294 translates the URL request data and unique user address ID from client computer and server 271 into the TCP/IP protocol and temporarily assigns, using DHCP (dynamic host configuration protocol) or IP auto configuration, client computer 272 with a fixed unique temporary 32-bit IP address. A firewall and router 295 is used to protect and route information within the switch center 293. The switch center 293 sends the requested URL Web pages to the data content aggregator 220 over the Internet 210. Telephone lines, a microwave link, or some other communications link 297 may also be used. The switch center 293 may be collocated with the data content aggregator 220 and directly transfer the requested URL Web pages to the data content aggregator 220.

The present invention does not exclude using a pure TPC/IP protocol with the split communications architecture with the DBS link 245 in FIG. 11 as a means to the aircraft 250 and INMARSAT, NATS, or HF back-channel 280 as a means from the aircraft 250. A faster more unique and robust communications architecture is better suited for remote wireless communications channels to and from a ground proxy computer 294, that is having the "true" real-time TCP/IP Internet session. This ground proxy computer 294 can be located at the network operations center 230 on the ground, and may be capable of hosting several unique Internet sessions (one for each unique airborne/aircraft client computer 272 user). The exemplary embodiment of the aircraft satellite communications system can use INMARSAT, which may include the option of using a low-cost X.25 packet data mode 3 INMARSAT link for the back-channel 280. Although this back-channel 280 can support IP header routing and control information and associated datagram delivery as defined by IETF RFC791, it can be shown that the header data traffic alone requires an appreciable percentage of available bandwidth significantly reducing information rate throughput under otherwise good forward channel conditions. Generally airborne wireless communications systems suffer bandwidth restriction issues, many times limiting data rates at or below 9600 baud or as low as 300 baud with HF communications. If Internet protocol is used with these types of narrow-band RF wireless air-to-ground (ATG) back-channel links, information throughput greatly suffers even if the ground-to-air (GTA) forward-channel supports wide band data. Even though a true TCP/IP sessions can be established via these low speed links, the time to download a typical homepage may take as many as 5 minutes at highly unattractive costs (usually several dollars to tens of dollars per minute). Usage of the Internet protocol (which has been optimized for higher communications channel data rates—above 9600 baud) is thus best limited to only the communications link between the ground proxy server 294 and the Internet 210. The asymmetrical split wireless communications channels (wide-band direct broadcast satellite for the GTA link 235 and INMARSAT, NATS, or HF for the ATG link) best serve as a file request and delivery avenue not engaging in the frequent TCP packet protocol overhead. Error checking and correcting is instead more optimally done at the file or even at the page level, greatly reducing the channel overhead and opening up and narrow bank back-channel bottleneck. Any absent or corrupt files may be identified by a checksum scheme at aircraft network server 271 and again requested or until a timeout occurs. Very large files, streaming audio or streaming video as a few examples, may be divided, delivered and error corrected via several appendable files by a subsystem of ground proxy server 294. These files are then brought through a reverse process once onboard aircraft server 271.

Standard Internet communications and browsing routinely leads to the reception by the client computer 272 in FIG. 11 of graphical files requiring significant amounts of bandwidth on satellite uplink 235 and DBS down link 245 to aircraft 250. Graphical files typically encountered on the Internet generally have not been optimized in file size or image quality, particularly for delivery over bandwidth restricted channels. The ground proxy server 294 may reduce this problem by compression of graphical Internet files prior to delivery to data content aggregator 220 and forwarding to client computer 272 on-board the aircraft. The ground proxy server 294 conserves bandwidth and increases Internet browsing speed on-board an aircraft by preprocessing in real-time Internet graphical files into reduced file sizes. This compression may or may not affect graphical image quality received by client computer 272 and does not affect textual information. The compression rate may be pre-selected by client computer 272 or ground proxy server 294 to obtain a desired image compression quality. The requested Internet files are recognized by ground proxy server 294 as graphics and are processed in real time automatically. The data compression techniques used may include but are not limited to wavelet algorithms, fractal algorithms, image resizing, JPEG (Joint Photographic Experts Group), MEPG (Motion Picture Experts Group) and JPEG 2000. Client computer 272 appears to have a normal Internet session when real-time data compression is in use and the graphics files have been reduced in size, however physical image sizes displayed by the browser remain unchanged.

To summarize operation of the aircraft satellite communications system 200, client computer 272 browses the Internet and makes a URL request over aircraft data bus 273 to aircraft network server 271. Network server 271 attaches a unique identification (ID) (non-IP, e.g. current in-use DBS satellite ID, aircraft tail number, flight number, global position (if available), date, and temporary session client number) for client computer 272 to the request and sends it on its modem 274 to aircraft back-channel radio 281 in some format compatible with radio 281. Radio 281 forwards the request through a SATCOM satellite 283 if a SATCOM link is in use. Satellite 283 beams request down to SATCOM ground station 284. At back-channel ground station 284, the URL request is received and translated to a phone line in public switched telephone network (PSTN) 290. The URL request on telephone network 290 is sent to switch center 293 where line switch 291 selects an available line for client computer 272. The URL request then goes to ground proxy server 294. Ground proxy server 294 receives the URL request and temporary client request and acts as client on behalf of client computer 272 by temporarily assigning an actual IP address for that session and forwards the request to Internet 210. The URL request is forwarded to requested Web site 205, the selected Web page is retrieved and forwarded via Internet 210 to data content aggregator 220, a part of direct broadcast satellite ground station 217, using tunneling software. The selected Web page may be sent to data content aggregator 220 over telephones, a microwave link or some other communications link 297. The ground proxy server 294 may be collocated at data content aggregator 220 and directly transfer the selected Web page. At the data content aggregator 220, data queue manager 222 is pre-programmed to weigh and select data from the other data services or the selected Web page, using a priority algorithm, to be forwarded to the respective DBS satellite in use as identified by the unique client computer address. The data is sent to the respective network operations center (NOC) 230 contained in direct broadcast satellite ground station 217 and matching client ID data. Network operations center 230 uplinks the requested Web page data to appropriate DBS satellite 240 along with other optional data services and television programming. DBS satellite 240 broadcasts the uplinked data to aircraft 250 aircraft antenna and antenna interface unit 261. The received signal is down converted at the antenna and antenna interface unit 261 to an L-band IF signal and passed to the DBS receiver 264 where the Web page data is demodulated and passed over the data bus 265 to the aircraft network server 271. The Web page is placed in a directory allowing random access or immediate direct delivery to requesting client computer 272.

Figure 12:
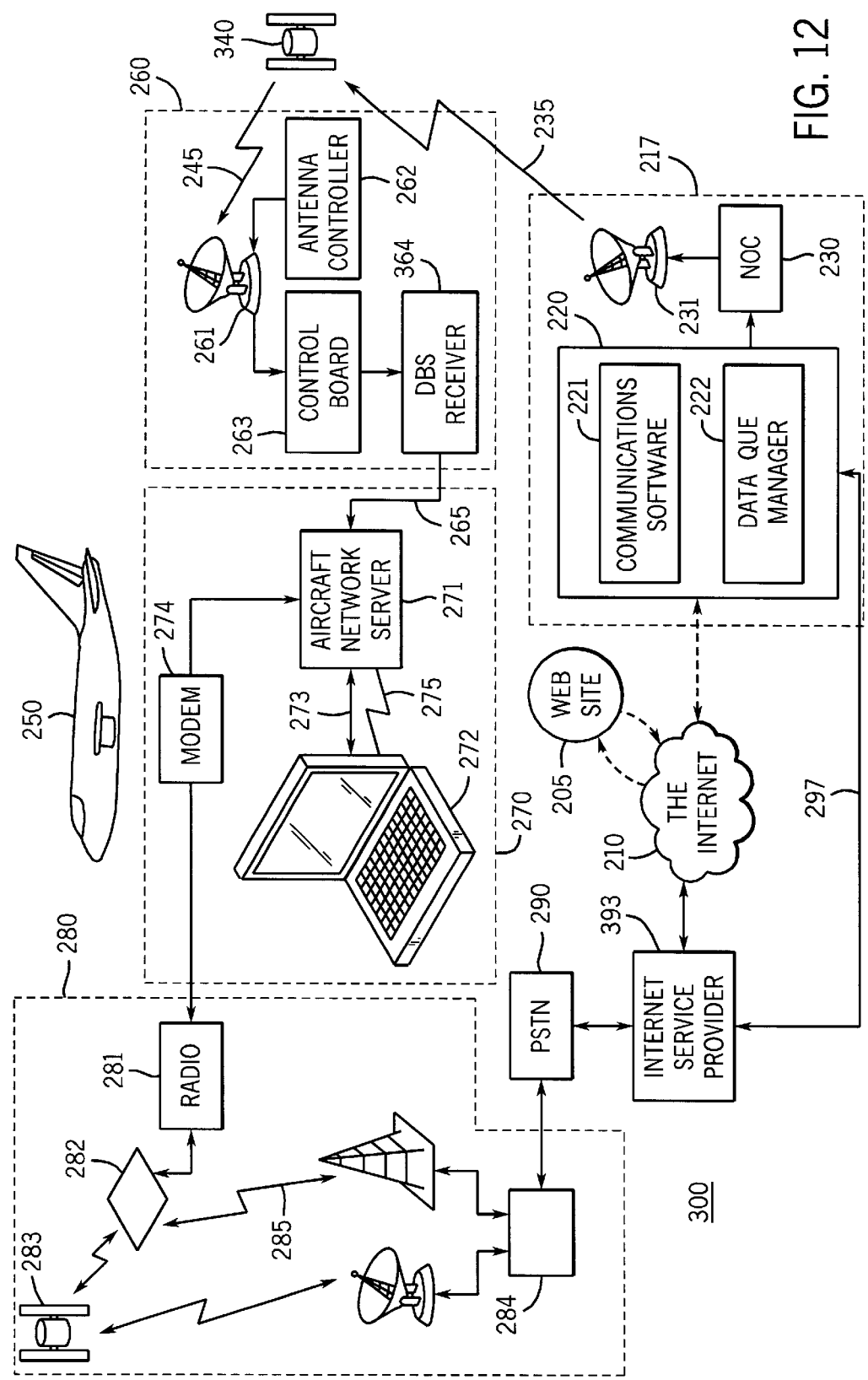
FIG. 12 is a general schematic bock diagram of an alternative satellite communication system for distributing Internet service from direct broadcast satellites to a mobile platform embodied as an aircraft.

With the aircraft satellite communications system 200 for distributing television programming and Internet service from direct broadcast satellites described in conjunction with FIG. 11, live direct broadcast satellite television programs and interactive Internet service can be received simultaneously. In FIG. 12 an alternate aircraft satellite communications system 300 for distributing Internet service from direct broadcast satellites according to the present invention is also disclosed. Several elements of the alternate aircraft satellite communications system 300 are the same as that described and disclosed in conjunction with FIG. 11. The elements of the systems in the two figures that are identical retain the same reference numbers in FIG. 12. Those elements of the system that may differ between the two systems are noted as a 300 number in FIG. 12. The embodiment disclosed in FIG. 3 uses an Internet direct broadcast satellite provider such as the Hughes Network Systems DIRECPC system. The embodiment of the invention in FIG. 12 assumes that the satellite that the Internet DBS provider is using, has sufficient transponder power to enable the use of a small aircraft dish antenna or other beam-steerable antenna system. The systems works much like that described in conjunction with FIG. 11. However, DBS TV is not included from the same satellite with current available systems. If television programming is desired another satellite providing such programming can be used and additional aircraft equipment to receive the programming can be installed. A direct broadcast satellite ground station 217 that may include an Internet interface 220, a network operations center (NOC) 230, and an antenna system 231. The Internet DBS provider uses Internet interface 220 with communications software 221 and a data queue manager 222 to interface Internet 210 and pass URL requests to network operations center 230. Network operations center 230 uplinks the Internet data to a satellite 340 where it is broadcast normally to ground based users. Satellite 340 in FIG. 12 differs from the satellite 240 in FIG. 11 in that it does not have television programming.

In the present embodiment of FIG. 12, satellite 340 transmits the Internet data to an aircraft 250. A DBS receiver system 260 on-board aircraft 250 receives the satellite Internet service with antenna and antenna interface unit 261. Antenna control unit 262 keeps antenna 261 pointed at satellite 340. DBS receiver control board 263 controls the receiver and the Internet service are processed with Internet DBS receiver 364. Internet DBS receiver 364 differs from the DBS receiver 264 in FIG. 11 in that it is not capable of receiving television programming.

The Internet data from Internet DBS receiver 364 is passed on a serial data link 265 to aircraft computer network 270 consisting of an aircraft network server 271 hosting DIRECPC. The aircraft network server distributes Internet service in aircraft 250 over an Ethernet or serial data link 273 such as IEEE 1394. A client personal computer or computing device may be connected to data link 273 for browsing the Internet and other network functions. This portion of the aircraft equipment is the same as in FIG. 11.

A communications back-channel 280 is also included in the embodiment shown in FIG. 12. A modem 274 in aircraft computer network 270 passes data from the client computer 272 to back-channel communications system 280. Back-channel communications system 280 can be a SATCOM phone radio 281 and associated antenna 282 to transmit data over a SATCOM satellite 283 such as INMARSAT to an appropriate ground station 284. Back-channel radio communications system 280 may also be a high frequency (HF) or very high frequency (VHF) terrestrial communications link 285 such as the AT&T NATS In-flight Telephony Network. The communications system may select a dial-up ISP telephone number based on global position and a selected or currently available satellite. This portion of the aircraft equipment is the same as in FIG. 11.

The data output from back-channel communications system 280 is passed over a telephone system such as PSTN 290 to an Internet service provider (ISP) 393 to interface Internet 210 as in FIG. 11. ISP 393 transfers requested Web pages over Internet 210 to Internet interface 320. Telephone lines, a microwave link, or other communications link 297 may be used. ISP 393 may be collocated with Internet interface 320 and directly transfer the requested Web pages.

Figure 13:
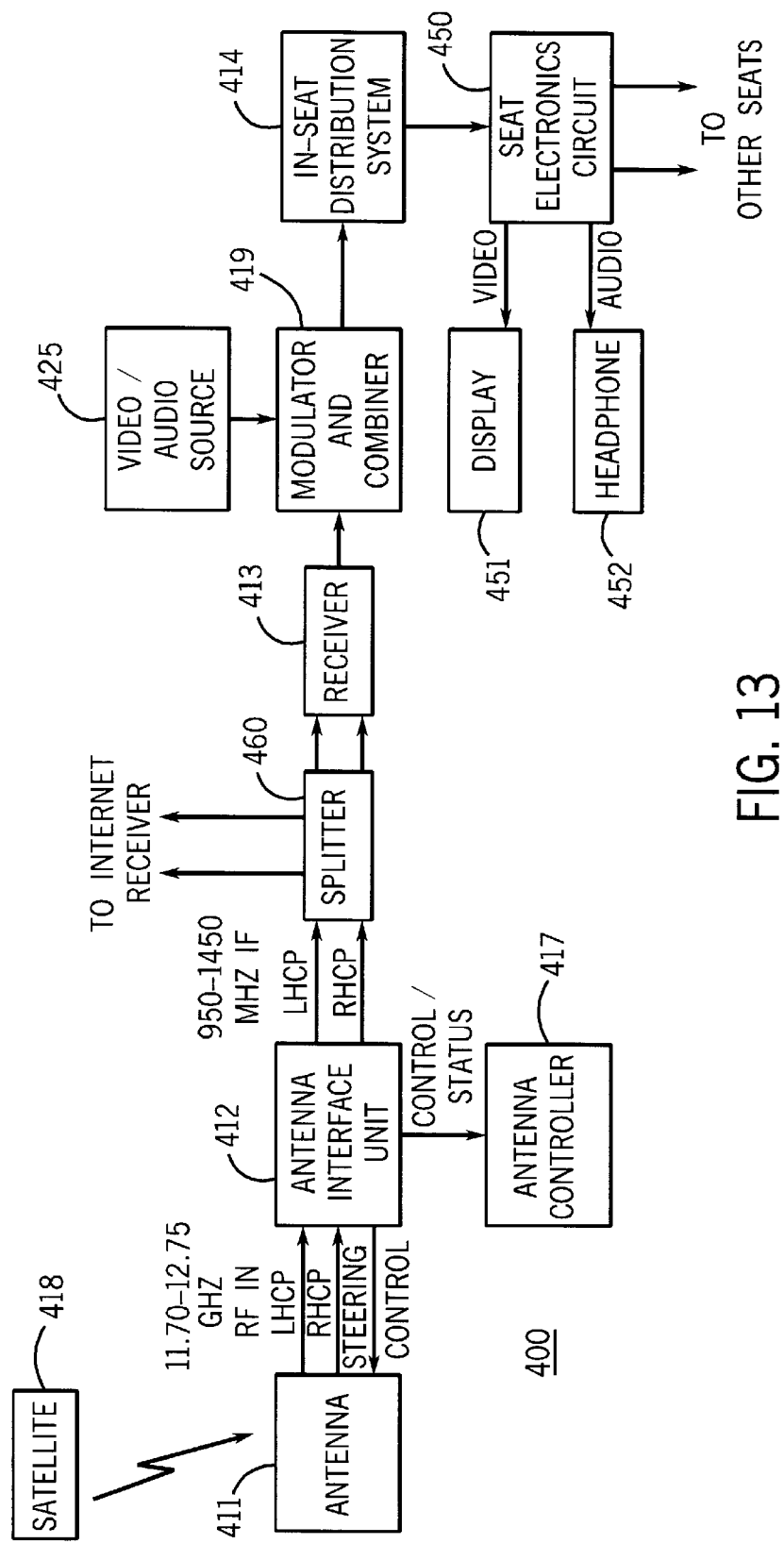
FIG. 13 is a general bock diagram of a satellite television system for use in a mobile platform embodied as an in-flight entertainment system of an airplane.

Aircraft satellite communications system 300 can be used with existing in-flight entertainment systems. A satellite television system 400 for receiving DBS television programming is shown in FIG. 13. Satellite television system 400 provides live television programming to individual seats on an aircraft and permits individual selection of channels by passengers.

Satellite television system 400 comprises an antenna 411 that is disposed adjacent the surface of the aircraft. Antenna 411 is pointed at satellites 418, such as Hughes or Echostar satellites for example, that are part of the existing direct broadcast satellite (DBS) system. Antenna 411 beam is steered so that it is locked onto the RF signal transmitted by satellite 418. Receiver system 400 may provide signal strength feedback assisting in maintaining an optimal link including a serial word or pilot tone indicating a signal strength. Antenna 411 is controlled by an antenna controller 417 that sends control signals and processes status signals to and from antenna 411 by way of an antenna interface unit 412. Antenna 411 may be mounted on antenna interface unit 412. Antenna 411 may be an electronically beam-steered antenna or a mechanically beam-steered antenna. Antenna interface unit 412 down converts received MPEG-encoded (compressed) RF signals to provide left hand circularly polarized RF signals and right hand circularly polarized RF signals that contain different sets of encoded television channels. The received encoded (compressed) RF signals are in the 11.70–12.75 GHz band that is down converted to IF signals in the 950–1450 MHz band commonly referred to as L-band.

The down converted encoded IF signals are processed by a receiver 413 to produce encoded video and audio signals corresponding to a plurality of encoded television channels. Encoded (compressed) video and audio signals are modulated by a modulator 419, which also is used as a combiner, to modulate signals derived from other video and audio sources 425, such as video and audio tape players. The modulated and encoded video and audio signals are then routed to an in-seat video and audio distribution system 414 that distributes them to each passenger's seat.

Seat electronics circuitry 450 is located at each passenger's seat. Seat electronics circuitry 450 demodulates, decodes and converts the modulated and encoded video and audio signals into signals that may be viewed and heard by the passenger at that seat by way of a display 451 and head phones 452.

In operation, the receiver serves to receive IF signal from antenna 411, but does not provide MPEG decoding or digital-to-analog conversion processes. The output of receiver 413, rather than a baseband video and analog audio output representing single television program, includes two serial data streams, one for each polarization. These MPEG-encoded data streams include all of the live television programming provided by satellites 418.

The encoded data streams are applied to RF modulator 419 along with signals from other entertainment sources such as video and audio regarding safety announcements or digital game data, for example. All of these signals are separately modulated and combined onto a single carrier. The resulting signal is distributed to the passengers by means of in-seat video and audio distribution system 414.

At each passenger seat or seat group, the signal is processed by seat electronics circuitry 450 wherein it is demodulated and processed appropriately according to individual signal type. For example, the baseband video and audio from video tape players may be applied to a tuner and converted to a form appropriate for use by seat's display 351 and passenger's headphones 452. In the case of MPEG-encoded live television data streams an MPEG decoder and digital-to-analog converters located within seat electronics circuitry 450 process the signals an generate baseband video and analog audio for use by the passengers. Since all television channels received from satellites 418 are contained within the data streams, each passenger can select any particular channel, without affecting other passengers.

An aircraft satellite communications system for distributing the Internet service can be added to an existing in-flight entertainment system shown in FIG. 13. Antenna 411 receives Internet service along with television programming. Antenna interface unit 412 down converts the signals to L-band IF signals as before. A splitter 460 can be inserted between antenna interface unit 412 and receiver 413 to tap off the L-band IF. The L-band IF output from splitter 460 is fed to the DBS receiver 264 in FIG. 11 and to the receiver 413 in FIG. 13. The split L-band IF outputs contain both television programming signals and the Internet service.

Antenna 411 and antenna interface unit 413 of FIG. 13 replace the antenna 261 of FIG. 11. Antenna controller 417 replaces antenna controller 262 in FIG. 11. Operation of the aircraft satellite communications system for distribution Internet 216 remains the same as previously discussed.

Figure 14:
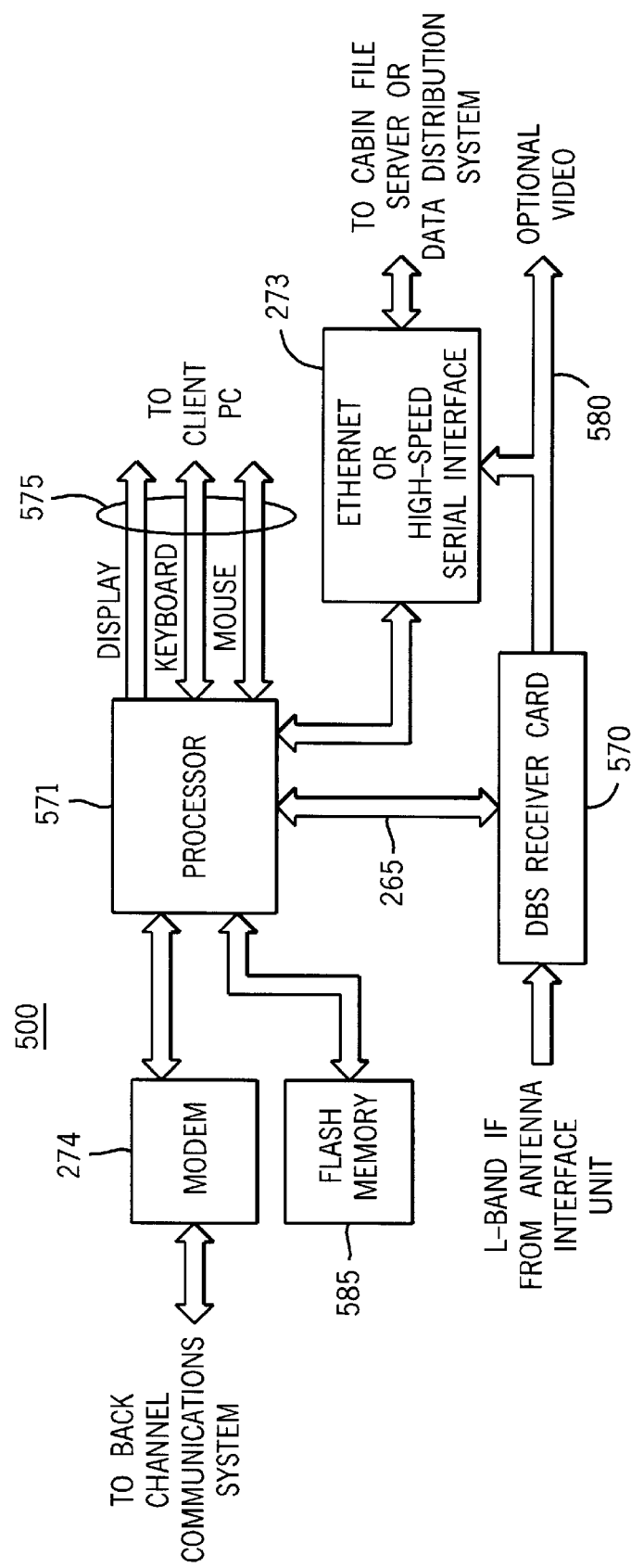
FIG. 14 is a general block diagram of a satellite receiver decoder unit including elements from the communication systems illustrated in FIGS. 11 and 12.

FIG. 14 shows a receiver decoder unit 500 that an be used in either system embodiment shown in FIGS. 11 and 12. Receiver decoder unit 500 combines several of the functions shown in FIGS. 11 and 12 into one unit on-board an aircraft 250. L-band IF signal from the antenna interface unit 261 of FIGS. 11 and 12 is connected to a DBS receiver card 570 that can be either 264 or 364 of FIG. 11 or 12 respectively. DBS receiver card 570 can be but is not limited to DBS TV programming such as Hughes DIRECTV or Echostar Dish Network or DBS Internet service such as DIRECPC. Serial link 265 between the DBS receiver card 570 and processor 571 can be a PCI interface or a USB interface. Processor 571 functions as aircraft network server 271 of FIGS. 11 and 12. Flash memory 525 may be used to store media content or Internet files used for a browser directory. Processor 571 may be directly connected to a client computer 272 through an optional direct connection 515. An Ethernet or high-speed serial interface 273 can be used to interface to an additional a cabin file server function or a data distribution system facilitating in-seat wide distribution. A modem 274 is connected to processor 571 and to back-channel communications system 280 to provide full interactive Internet service. Modem 274 and back-channel communications system 280 are not required in a broadcast only Internet application option.

Receiver card 570 in FIG. 14 may also include a one-way high-speed data output option 520 that may be used to deliver television programming or Internet service. Using a DBS receiver card 570 with this data output option 580 allows a single board hardware solution for delivering both television programming and Internet service.

Figure 15:
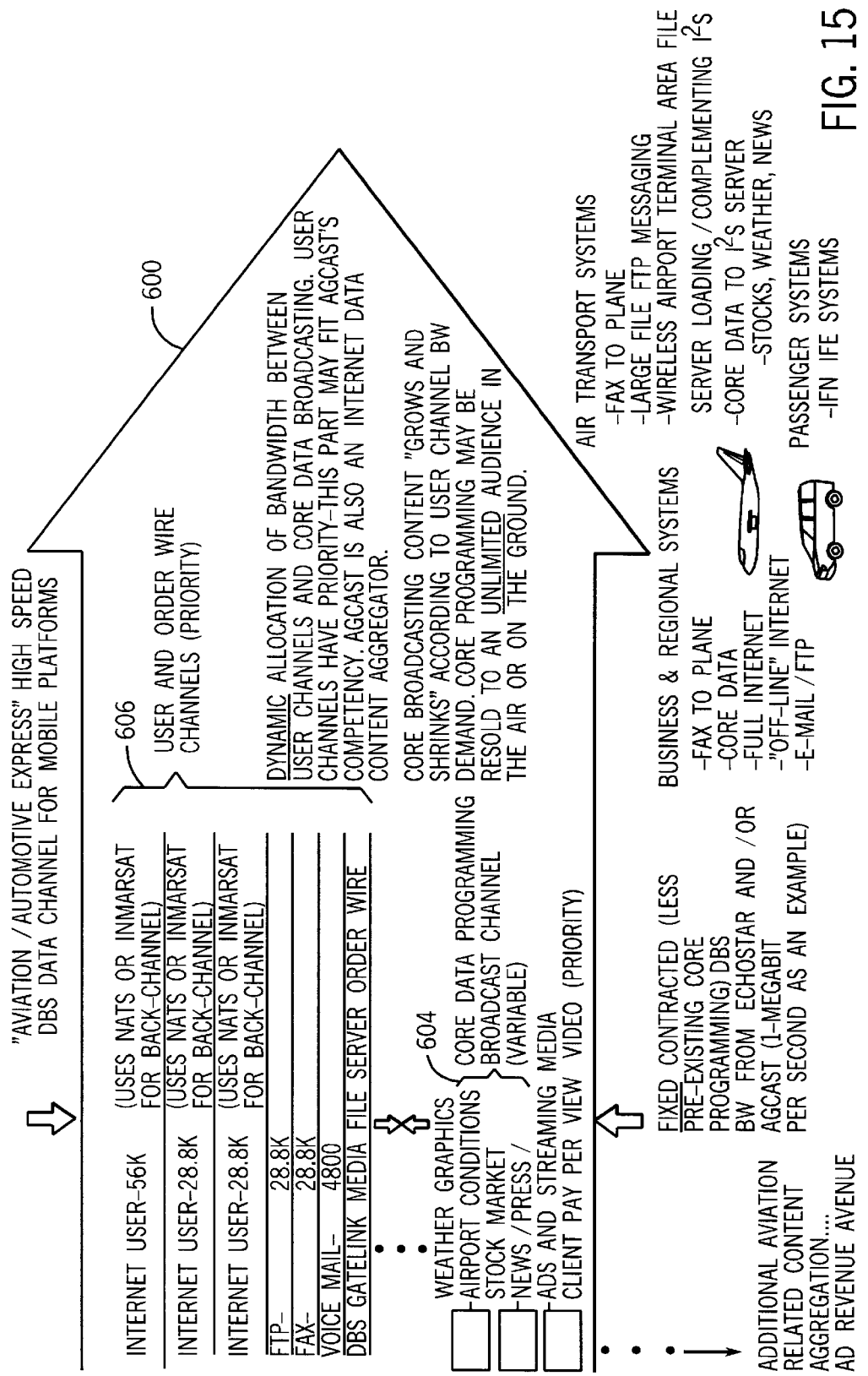
FIG. 15 is a schematic block diagram of the communication bandwidth associated with the communication system illustrated in FIG. 1.

With reference to FIG. 15, bandwidth 600 for system 30 (FIG. 1), system 100 (FIG. 6), or system 200 (FIG. 11) includes core channels 604 and user and order wire channels 606. The core data programming channels 604 can include weather graphics, airport conditions, stock market information, news, movies, or other information. The size of the core broadcasting content (e.g., channels 604) can grow and shrink according to the bandwidth demands on user and order wire channels 606. In one embodiment, bandwidth associated with core programming channels 604 may be resold to an unlimited audience in the air or on the ground. User and order wire channels 606 have priority to ensure proper access to the Internet and protection of business services, such as, fax, e-mail, phone messages and other important media.

Figure 16:
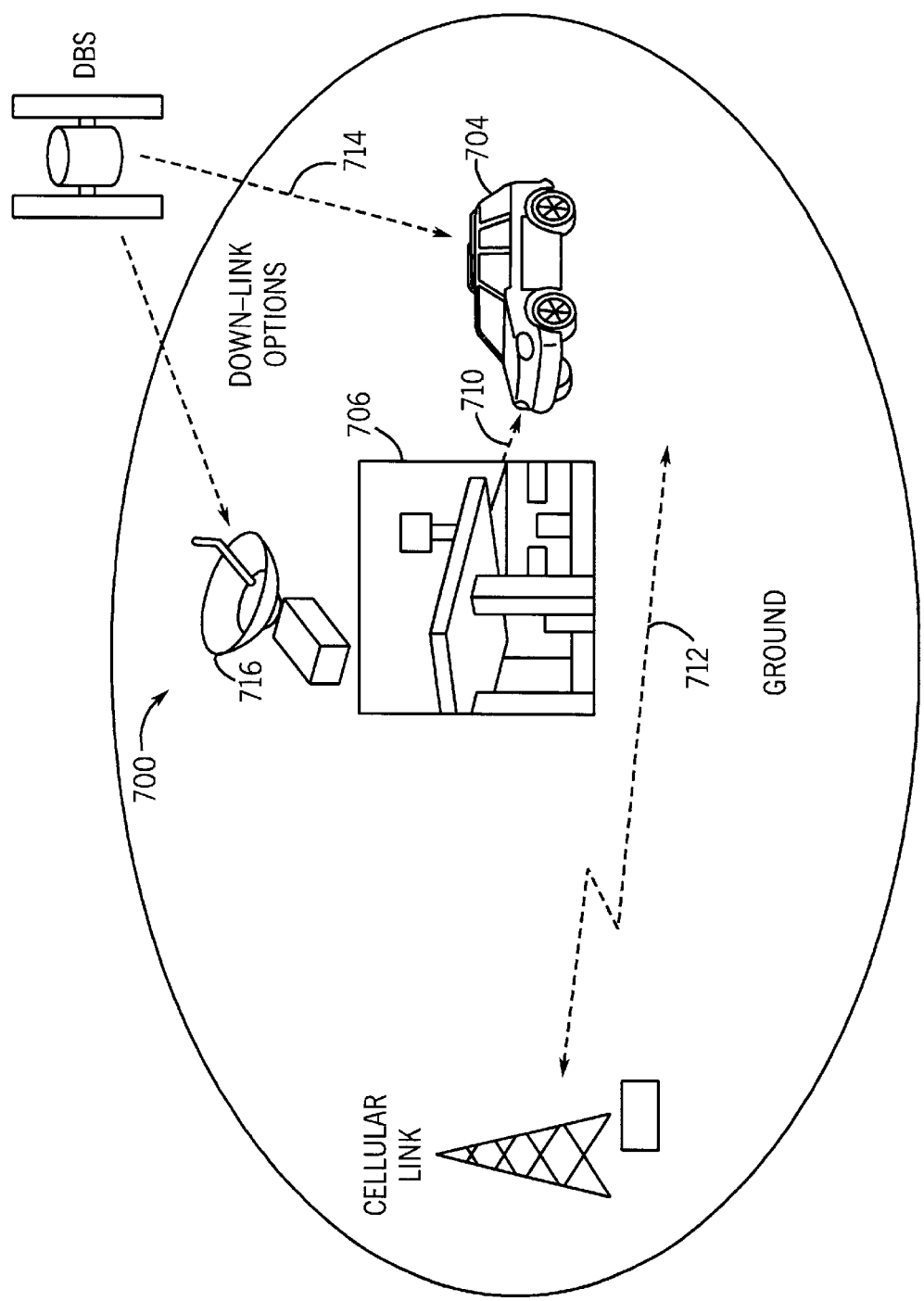
FIG. 16 is general schematic block diagram of a satellite communication system for distributing television programming and Internet service from direct broadcast satellites to a mobile platform embodied as an automobile.

With reference to FIG. 16, communications system 700 is similar to communication systems 30, 100 and 200 discussed with reference to FIGS. 1–15. Communication system 700 is shown for use with a mobile platform such as an automobile 704. Automobile 704 is shown at a docking area such as a tollbooth, garage, or gas station 706. While parked at gas station 706, automobile 704 can receive high speed video data via a short-range link 710 similar to wireless gate link 130. Gate link 710 can be disposed with respect to a gasoline pump for other objects to provide wireless linking capabilities while automobile 704 is receiving gasoline.

Gate link 710 can be utilized to provide maps about the destination associated with gas station 706, movies for storage and viewing on automobile 704, Internet data, or other data. For example, occupants of vehicle 704 may wish to rent a movie ordered through gate link 710. The movie can be loaded through gate link 710 as vehicle 704 is fueled. In addition, automobile 704 can utilize a cellular link 712, as well as direct broadcast satellite link 714. Gas station 706 can include a down link antenna 716 for loading a data storage warehouse similar to that shown in FIG. 9 or storage media for providing information across link 710.

In addition, system 700 can be utilized to achieve an automotive internet application which operates similar to communications system 200 discussed with reference to FIGS. 10–15. For example, link 712 can serve as a request link while channel 714 serves as a high speed channel for delivering return Internet information. Vehicle 104 is equipped with a satellite antenna to receive information on link 714. The antenna can utilize an inertial and GPS assisted steering mechanism. For push-type Internet service, automobile 704 can receive information via link 710 for local internet data (push-type access). The movies can be programmed to expire with time or use. Automobile 704 which can be a van, truck, bus or sports utility vehicle can be equipped with receiving and transmitting apparatus similar to systems 30, 100 and 200. For example, automobile 704 can include a store and forward server which includes a satellite receiver-decoder. Movies can be programmed to expire with time or use.

It is believed that the aircraft satellite communications system for distributing direct broadcast satellite service from direct broadcast satellites of the present invention and many of its attendant advantages will be understood by the foregoing description, and it will be apparent that various changes may be made in the form, construction and arrangement of the components thereof without departing from the cope and spirit of the invention or without sacrificing all of its material advantages. The form herein before described is merely an explanatory embodiment thereof. It is the intention of the following claims to encompass and include such changes.

What is claimed is:

1. A communication system for a mobile platform, the communication system comprising:

a first receiver circuit disposed on the platform and being a C-band receiver;

a second receiver circuit disposed on the platform and being a Ku-band receiver;

a control circuit coupled to the first receiver circuit and the second receiver circuit, wherein both receiver circuits receive video data, and wherein the control circuit selects the video data from the first receiver circuit and the second receiver circuit to continuously receive the video data as the mobile platform moves from a first zone to a second zone; and a video display circuit, in communication with the first receiver circuit and the second receiver circuit and receiving the video data, the video display circuit displaying images derived from the video data on-board the mobile platform.

2. The communication system of claim 1, wherein the video data includes Internet data, safety message data, advertisement data, or entertainment data.

3. The communication system of claim 1, wherein the mobile platform is a bus, truck, boat, ship, airplane, helicopter, car, train, gondola, van, or monorail vehicle.

4. The communication system of claim 1, wherein the mobile platform is an airplane.

5. The communication system of claim 1, wherein the mobile platform is a boat, ship or train.

6. The communication system claim 1, wherein the mobile platform is a road traveling vehicle.

7. The communication system of claim 1, wherein the video data includes Internet data.

8. The communication system of claim 1, wherein the video data includes safety message data.

9. The communication system of claim 1, wherein the video data includes entertainment data.

10. The communication system of claim 1, wherein the first zone is over an ocean and the second zone is over land.

11. The communication system of claim 1, wherein the control utilizes geographic position data to select the C-band receiver circuit and the Ku-band receiver circuit.

12. The communication system of claim 1, wherein the control circuit utilizes reception quality data to select the C-band receiver circuit and the Ku-band receiver circuit.

13. A communication system for a mobile platform, the communication system comprising:

a first receiver circuit disposed on the platform and being a C-band receiver;

a second receiver circuit disposed on the platform and being a Ku-band receiver;

a control circuit coupled to the first receiver circuit and the second receiver circuit, wherein both receiver circuits receive video data, and wherein the control circuit selects the video data from the first receiver circuit and the second receiver circuit to continuously receive the video data as the mobile platform moves from a first zone to a second zone; and a short range transceiver for receiving the video data when the mobile unit is docked.

14. The communication system of claim 13, wherein the short range transceiver communicates via an optical data link.

15. A method of receiving video data on a mobile platform, the method comprising:

selecting by a control circuit, first video data received by a C-band receiver, the first video data being transmitted from a C-band-type satellite when the mobile platform is in a first zone for playback on the mobile platform; and selecting by the control circuit, second video data received by a Ku-band receiver, the second video data being transmitted from a Ku-band-type satellite receiver circuit when the mobile platform is in a second zone for playback on the mobile platform, wherein the first zone is an area where the second video data can be effectively received from the Ku-band-type satellite, wherein the control circuit selects the video data from the C-band receiver and the Ku-band receiver to continuously receive the video data as the mobile platform moves from the first zone to second zone.

16. The method of claim 15, wherein the mobile platform is an airplane.

17. The method of claim 15, wherein the mobile platform is a road traveling vehicle.

18. The method of claim 15, wherein the first zone is over an ocean and the second zone is over land.

19. The method of claim 15, wherein the mobile platform is a ship.

20. A communication system for a mobile platform, the communication system comprising:

a short range receiver disposed on the platform;

a first receiver circuit disposed on the platform;

a second receiver circuit disposed on the platform; and a control circuit coupled to the first receiver circuit and the second receiver circuit, wherein both receiver circuits receive video data, and wherein the control circuit selects the video data from the first receiver circuit and the second receiver circuit to continuously receive the video data as the mobile platform moves from a first zone to a second zone, wherein the control circuit selects the video data from the short range receiver when the mobile platform is docked.

* * * * *